United States Patent
Ciciriello et al.

(10) Patent No.: US 11,698,026 B2
(45) Date of Patent: Jul. 11, 2023

(54) SYSTEM AND METHOD FOR CONTROLLING A JOURNAL BEARING

(71) Applicant: Rolls-Royce Deutschland Ltd & Co KG, Blankenfelde-Mahlow (DE)

(72) Inventors: Lucia Ciciriello, Potsdam (DE); Andreas Paetzold, Potsdam (DE); Olaf Wuestefeld, Berlin (DE); Keith Laxton, Rangsdorf (DE); Rafael Carvalho, Berlin (DE)

(73) Assignee: ROLLS-ROYCE DEUTSCHLAND LTD & CO KG, Blankenfel de-Mahlow (DE)

( * ) Notice: Subject to any disclaimer, the term of this patent is extended or adjusted under 35 U.S.C. 154(b) by 44 days.

(21) Appl. No.: 17/333,517

(22) Filed: May 28, 2021

(65) Prior Publication Data

US 2021/0372478 A1 Dec. 2, 2021

(30) Foreign Application Priority Data

May 28, 2020 (EP) ..................................... 20177133
Aug. 6, 2020 (EP) ..................................... 20189875

(51) Int. Cl.
*F02C 7/06* (2006.01)
*G01M 13/045* (2019.01)
(Continued)

(52) U.S. Cl.
CPC .............. *F02C 7/06* (2013.01); *G01H 1/006* (2013.01); *G01M 13/045* (2013.01);
(Continued)

(58) Field of Classification Search
CPC .................................. G01H 1/006; F02C 7/06
See application file for complete search history.

(56) References Cited

U.S. PATENT DOCUMENTS 4,696,585 A  9/1987  Swearingen et al.
4,767,223 A *  8/1988  Goodwin ................ F16C 17/24
                                         384/114
(Continued)

FOREIGN PATENT DOCUMENTS

DE  102010022574 A1  12/2011
DE  102011006125 A1  9/2012
(Continued)

OTHER PUBLICATIONS

European Search Report dated Nov. 24, 2020 from counterpart European Patent Application No. 20177133.4.
(Continued)

*Primary Examiner* — Courtney D Heinle
*Assistant Examiner* — John S Hunter, Jr.
(74) *Attorney, Agent, or Firm* — Shuttleworth & Ingersoll, PLC; Timothy J. Klima

(57) ABSTRACT

A system including: a journal bearing having a carrier, a rotor arranged rotatable about a rotational axis relative to the carrier, and a fluid in a clearance between the rotor and the carrier. A sensor measures a vibration signal of the rotor. A control system is adapted to determine a pressure set point for the fluid in the clearance based on the vibration signal, and to provide control signals generated based on the pressure set point. An active device is adapted to modify the pressure of the fluid in the clearance based on the control signals.

17 Claims, 15 Drawing Sheets

(51) Int. Cl.
*G01M 15/14* (2006.01)
*G01H 1/00* (2006.01)

(52) U.S. Cl.
CPC ......... *G01M 15/14* (2013.01); *F05D 2260/80* (2013.01); *F05D 2260/83* (2013.01); *F05D 2260/96* (2013.01); *F05D 2270/02* (2013.01); *F05D 2270/301* (2013.01); *F05D 2270/303* (2013.01)

(56) References Cited

U.S. PATENT DOCUMENTS

| | | | |
|---|---|---|---|
| 7,025,559 B2 * | 4/2006 | Loy | F01D 11/025 416/61 |
| 2018/0252166 A1* | 9/2018 | Pointon | F16H 1/28 |

FOREIGN PATENT DOCUMENTS

| | | |
|---|---|---|
| EP | 0270354 A2 | 6/1988 |
| EP | 2085578 A2 | 8/2009 |
| EP | 2161417 A1 | 3/2010 |
| EP | 2626577 A1 | 8/2013 |
| EP | 3447469 A1 | 2/2019 |
| EP | 3594516 A1 | 1/2020 |
| WO | 2009013453 A1 | 1/2009 |
| WO | 2018002277 A1 | 1/2018 |

OTHER PUBLICATIONS

European Search Report dated Feb. 2, 2021 from counterpart European Patent Application No. 20189875.6.

* cited by examiner

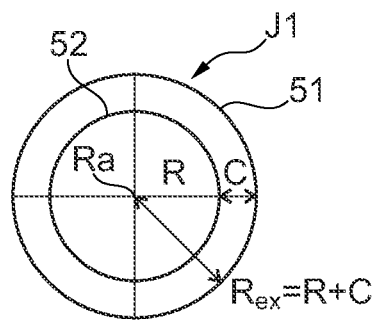
Fig. 2A
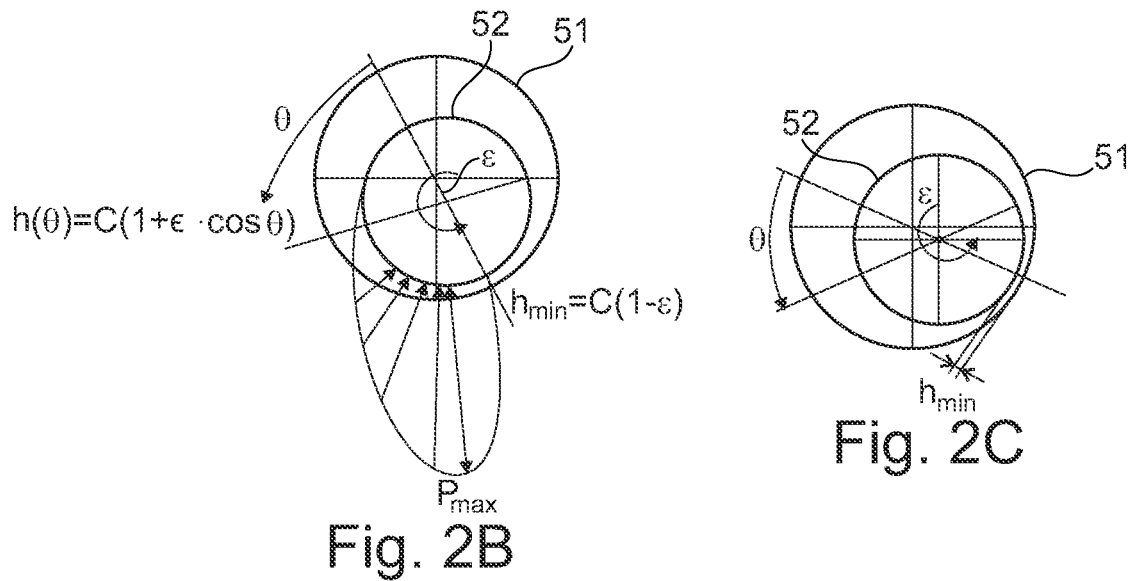
Fig. 2B
Fig. 2C
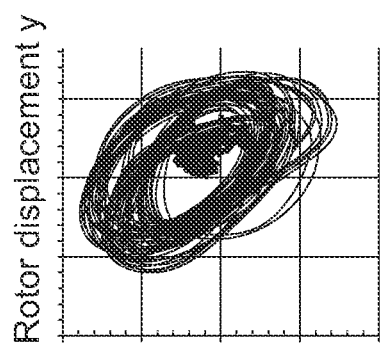
Fig. 3
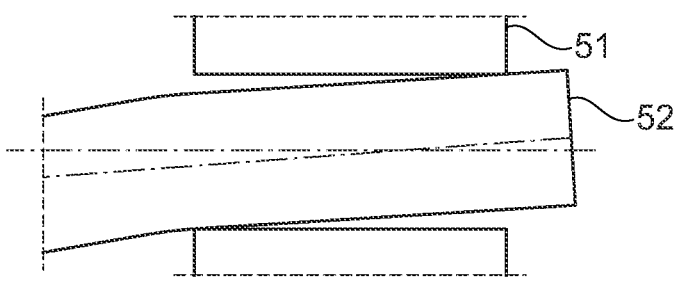
Fig. 4

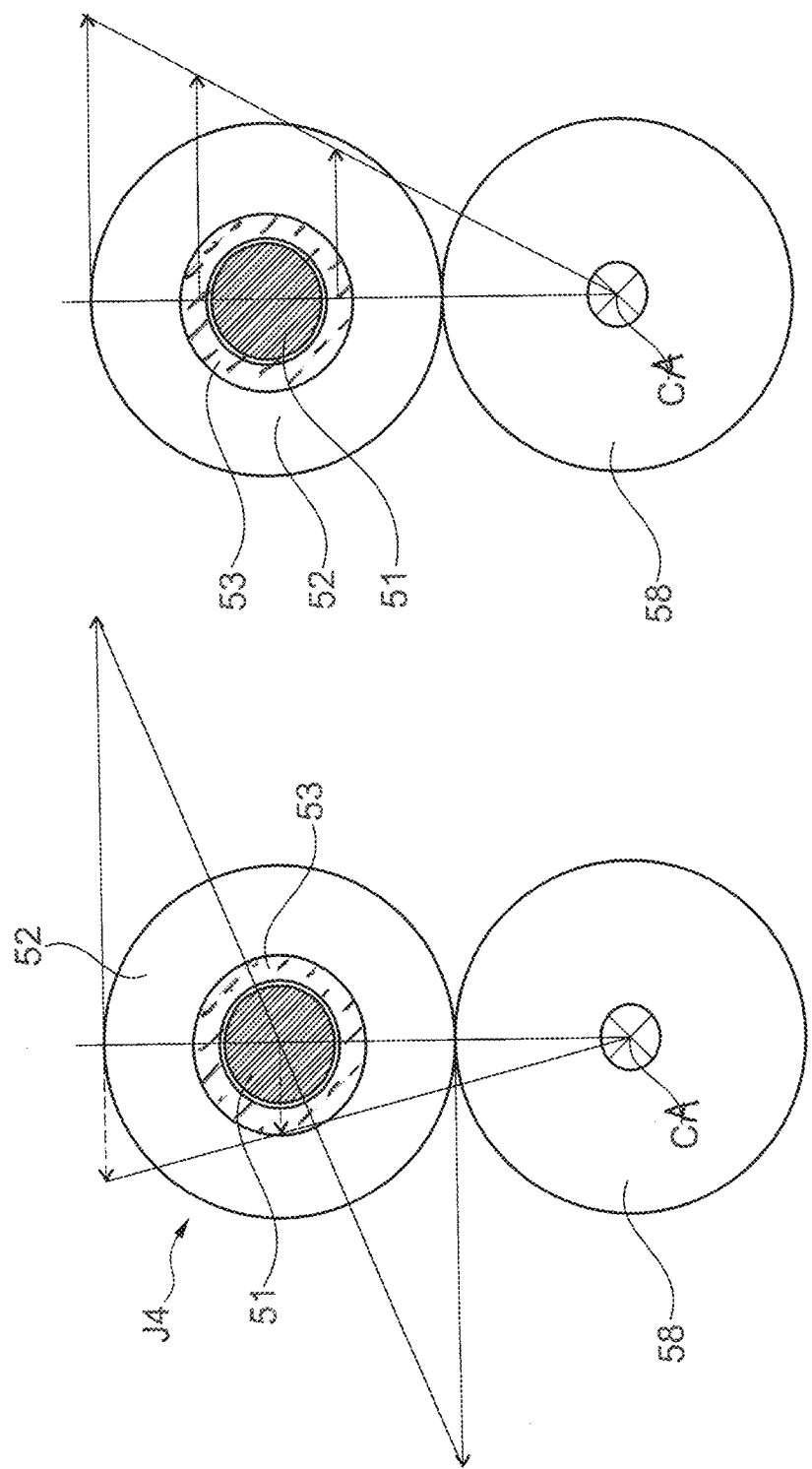

SYSTEM AND METHOD FOR CONTROLLING A JOURNAL BEARING

REFERENCE TO RELATED APPLICATIONS

This application claims priority to European Patent Application No. 20 177 133.4 filed on May 28, 2020, and to European Patent Application No. 20 189 875.6 filed on Aug. 6, 2020, the entirety of which is incorporated by reference herein.

BACKGROUND

The present disclosure relates to a system and method for controlling a journal bearing, and to a gas turbine engine.

Hydrodynamic journal bearings are widely used, particularly in applications where high load capacities are required. An application of hydrodynamic journal bearings are gas turbines, such as gas turbine engines or stationary plants. Therein, a rotor is rotatably arranged at a carrier, wherein a film of fluid, such as oil, lubricates the rotational motion. The carrier may be a stationary part. Alternatively, the carrier may itself perform a motion, particularly a rotary motion. For instance, a planet carrier of a planetary gearbox may serve as carrier for various planet gears as rotors, wherein the planet carrier itself is rotatable with respect to sun and ring gears of the gearbox. For example, the gearbox may be an epicyclic gearbox. Therein, the carrier may rotate with respect to a stationary part, e.g., a ring gear of the gearbox. The carrier may be a part of a carrier device comprising more than one carrier (and more than one journal bearing). Alternatively, the carrier may be stationary. For example, the gearbox may have a star configuration, wherein the carrier (e.g., of a carrier device) is held fixed, e.g., with respect to a frame, while sun and ring gears of the gearbox are each allowed to rotate with respect to the carrier device, wherein planet gears, each engaging both sun and ring gear, are rotatably mounted on the respective carrier.

A common problem in the field of rotating machinery is controlling the level of vibration. Vibration may be caused by imbalances of rotating parts, such as a shaft and supported rotatable elements, such as, e.g., compressor and turbine discs and blades in gas turbine engines, and also external forcing such as, e.g., aircraft maneuvers and aerodynamic forces in the aircraft. In hydrodynamic journal bearings, fluid excited instabilities may occur at certain operating conditions, in particular at high speeds. Oil film induced vibrations may cause additional dynamic (in particular cyclic) displacements onto the rotor (e.g., journal) with the effect of increasing the orbits of the rotors. Precession orbits may appear in superposition with the journal spinning and appear combined in different ways depending on the possibilities given by the system clearances and degrees of freedom of the journal shaft (e.g., a system where the axes of the journals are carried in precession may present several onsets of orbiting, each one corresponding to specific frequencies in the vibration signature.

Precession orbits can be backwards or forwards with respect to the journal sense of rotation and this also change the frequency in the vibrational signature. Oil film induced vibrations can increase the shaft orbits or, in case the shaft is prevented to orbit any further, in turn may variate the oil film gap and, therefore, the oil pressure distribution. By this, also the rotor clearances and the shaft alignment may be influenced.

The oil film induced vibrations can appear both in a stable or instable onset, the difference depending on whether the magnitude of the vibration remains constant versus time, in stationary speed and loads, or increases rapidly also at steady conditions.

Even though the instable vibrations are, in general, the most dangerous and regularly require quick corrective actions, also stable oil film induced vibrations may reduce the life time of parts, increase the noise, and create a condition prone to degenerate into instability.

Stable oil film-induced vibrations are often indicated with the term oil whirl (wherein the term whirl relates to orbits), whilst with the term the oil whip vibrations having a divergent, instable behavior are indicated. The oil whip has the same mechanism as the oil whirl but can be more critical and is almost always instable, because in this case the periodic force induced by the oil film excites a rotor resonance. Even though this distinction is correct in most cases, there are also instable oil whirl and relatively stable oil whip (the latter being anyways dangerous because the rotor can suddenly become incontrollable causing metal to metal contacts).

Phenomena specific to journal bearings are so-called oil whirl and oil whip. A vibration referred to as oil whirl is a stable (non-divergent) vibration that generates precession orbits that usually remain constant in amplitude when the system is dwelled at steady conditions. Oil whirl can be sub-synchronous or synchronous with respect to the rotor. Whether the precessional orbit is travelled by a journal at about half of the rotor speed or at a speed close or equal to the rotor speed, depends on speed and load conditions. The frequency at which the precessional orbit is travelled is related to the average tangential speed of the oil film mass contained in the journal bearing. When oil whirl and oil whip set in, hydraulic forces may destabilize and increase the motion of the rotor and induce a self-excited vibration. Such a vibration typically has very high amplitudes. In turn, the rotor can be forced into a large eccentricity that could even lead to a collision with the carrier. This effect may thus reduce the lifetime of the journal bearing or could even cause a sudden failure. Particularly stiffer rotor systems with reduced clearances are prone to detrimental oil film instability when the journal bearing undergoes high loads and speeds.

SUMMARY

It is an object to reduce vibration in journal bearings.

According to an aspect there is provided a system for monitoring a journal bearing. The system comprises the journal bearing, wherein the journal bearing has a carrier, a rotor arranged rotatable about a rotational axis relative to the carrier, and a fluid, e.g. an oil, in a clearance between the rotor and the carrier; means to determine a rotational speed of the rotor relative to the carrier; at least one sensor to measure a vibration signal of the rotor; and a control system adapted to determine whether or not the vibration signal of the rotor comprises a frequency that is synchronous with the rotational speed, or near-synchronous within a predefined range of frequencies adjacent synchronicity with the rotational speed.

The system may further comprise one or more active means operatively coupled with the control system. The active means are adapted for detuning the journal bearing vibration in response to the provision of the control signal by the control system. Thus, upon monitoring an oil film instability, the control system may trigger counter-measures to avoid loss of structural integrity of the journal bearing, and, eventually, of the whole system as a consequence.

According to an aspect, a system for monitoring a journal bearing and for counteracting a monitored oil film critical vibration and/or instability or incident oil film critical vibration and/or instability is provided. The system may be in accordance with any aspect or embodiment described herein. The system comprises the journal bearing, wherein the journal bearing has a carrier, a rotor arranged rotatable about a rotational axis relative to the carrier, and a fluid in a clearance between the rotor and the carrier; (optionally: means (e.g., a speed sensor, or an interface coupled to another controller that monitors the speed) to determine a rotational speed of the rotor relative to the carrier) at least one sensor to measure a vibration of the rotor (the system may further comprise at least one sensor to measure a phase of a vibration with respect to at least one rotating component, e.g., the rotor, and/or at least one sensor to measure the fluid pressure and/or temperature); a control system adapted to provide a control signal when the vibration comprises a frequency that is in a predefined range relative to the rotational speed and/or adapted to provide a control signal when the vibration has an amplitude above a predefined threshold; and one or more active means comprising active means to decrease the pressure (e.g., oil feed pressure) and/or increase the temperature of the fluid in the clearance by one or more predefined steps in response to the provision of the control signal by the control system.

This is based on the finding that an oil film critical vibration, such as an oil film instability, e.g., sub-synchronous instabilities and particularly synchronous oil film instabilities, can be effectively counteracted by decreasing the viscosity of the oil and reducing the oil pressure within the oil gap. By changing the temperature and/or pressure not continuously, but in predefined steps it is possible to observe the effect in a controlled manner before effecting another change by a further step. An example for such a step is +/−0.05% of a maximum oil feed pressure.

It is worth noting that regulating both the fluid temperature and the fluid pressure (in particular at the same time) in response to the provision of the control signal by the control system allows to very effectively counteract critical vibrations, in particular in case of relatively stiff geared rotors.

Optionally, the one or more active means may additionally comprise active means to change a speed of the journal bearing, or a torque, e.g., by performing an action by an engine controller.

According to an aspect there is provided a system comprising a journal bearing having a carrier, a rotor arranged rotatable about a rotational axis relative to the carrier, and a fluid, e.g., an oil, in a clearance between the rotor and the carrier. The system further comprises at least one sensor to measure a vibration signal of the rotor, active means adapted to modify the pressure of the fluid in the clearance based on received control signals, and a control system adapted to determine a pressure set point for the fluid in the clearance directly or indirectly based on the vibration signal, and to provide the control signals to the active means generated based on the pressure set point.

This is based on the finding that vibrations can be effectively addressed by making a pressure set point (directly or indirectly) dependent on the vibration signal, because the viscosity of the oil may be changed in this manner such as to disrupt incoming oil film instabilities. Optionally, the system comprises means to determine a rotational speed of the rotor relative to the carrier, and the determination of the pressure set point may additionally be based thereon.

Optionally, the control system is adapted to determine the pressure set point by selecting one of a set of (stepped) predefined pressure set points based on the vibration signals. This allows to perform measurements and/or simulations in advance to determine specific steps at which all security margins are maintained. Therefore, it can be made sure that no unexpected effects are initiated by the pressure change.

Further, each predefined pressure set point of the set of predefined pressure set points may be a value between a minimum pressure value and a maximum pressure value. Optionally, the control system is adapted to determine the minimum pressure value and the maximum pressure value based on the rotational speed and/or based on a power transmitted by the journal bearing. By defining all possible pressure set point steps between these two limits the basic functionality of the journal bearing is always maintained. By changing the pressure not continuously, but in predefined steps it is possible to observe the effect in a controlled manner before effecting another change by a further step. By this, self-excitations can be avoided. Also, transient effects can be reduced or excluded. The control system may be adapted to select the predefined step as set point depending on the current operating conditions (e.g., speed and/or torque). The steps may be defined in a look up table (LUT) that may be, e.g., populated on the basis of design and limits of the journal bearing, in order to ensure the detuning of the oil film instability to happen without compromising the system stability. It is worth noting that in many use cases the journal bearing is required to be able to withstand the loads due to speed and torque at any time, also during the regulation to disrupt oil film induced critical vibration and instability. Therefore, the control system may store predefined limits, e.g., calculated for the respective bearing design. These limits may define ranges for pressure and/or temperature variations (e.g. in % of the nominal values) that are not to be exceeded. These stored limits may variate with speed, torque and/or other (e.g., aircraft) conditions, and may be available in a look-up table.

According to an embodiment, the control system is adapted to generate the control signals by means of a feedback control loop. The feedback control loop, optionally, uses a pressure value (e.g., a current feed pressure of the fluid) and/or the vibration signal (or a value derived therefrom) as feedback parameter. The value derived from the vibration signal may be a value determined by a vibration analysis, in particular as described further below.

Optionally, the active means is an adjustable valve, e.g., a servo valve. The active means may comprise one or more electronically controlled servo-mechanisms and/or mechanical relief valves. The system may comprise an arrangement of valves controlled by the control system.

The control system may be further adapted to determine whether or not the vibration signal of the rotor comprises a frequency that is synchronous with the rotational speed, or near-synchronous within a predefined range of frequencies adjacent synchronicity with the rotational speed. Alternatively or in addition, the control system is adapted to determine whether the vibration signal comprises a frequency that is in a predefined range relative to the rotational speed and/or has a magnitude above a predefined threshold. In either case, the control system may select the pressure set point based on the result of the determination (and, thus, indirectly based on the vibration signal). For example, the control system may be adapted to, when a corresponding frequency is determined, reduce the pressure by selecting the pressure set point among the plurality of predefined set points. The set point may be lower than a current pressure of the oil in the clearance. Thus, an oil film instability may be effectively disrupted.

This is based on the finding that critical oil film vibrations and instabilities appear as a particular vibration signature, wherein particularly for journal bearings with relatively high stiffness and a relatively narrow clearance between the carrier and the rotor (such as in gear trains and especially in journal bearings that carry gears, e.g., planet or idler gears, which mesh with two gears at the same time) a synchronous (oil film) vibration and/or instability can have particularly strong impact on wear of the journal bearing, or could even lead to a failure. Therefore, monitoring the onset of such vibration or instability, allows to react quickly, if necessary. This allows an improved control of hydrodynamic vibrations and instabilities, so that the lifetime and security of the journal bearing can be improved. It is worth noting that the genesis of synchronous oil film induced vibration may generate dynamic loads onto the rotor that have the effect of making the rotor orbiting while spinning. In this case, the precession orbit is travelled by the rotor at the rotor speed (frequency) or close to.

The frequency of the vibration may directly be measured, or it may be determined using Fourier transformation, e.g., implemented as fast Fourier transformation (FFT). Optionally, one or more predefined threshold(s) for frequency, phase and/or vibration magnitude(s) is/are defined, e.g. in a look-up table. This allows to define a baseline, or nominal acceptable operational conditions, to compare to compare the monitored data and exclude false positives.

The system may further comprise at least one sensor to measure a phase of a vibration with respect to at least one rotating component, e.g., the rotor. Alternatively or in addition, the system may comprise one or more sensors to measure fluid (e.g., oil) pressure and/or one or more sensors to measure fluid (e.g., oil) temperature. An active control can disrupt the fluid (e.g., oil) instability by changing fluid pressure and/or temperature. The system may be adapted to measure and/or receive torque and/or power transmitted by the journal bearing. It is worth noting that that for applications at engines, e.g., gas turbine engines, engine speed and power (or torque) signals may be made available to the monitoring system (e.g., obtained from a FADEC of the engine).

The monitoring system may be able to detect all typologies of orbits mentioned above and, therefore, to identify all possible onsets of oil film vibrations. During operation, oil whirl vibrations can degenerate into an instable oil whip, for instance if changing speed and/or torque, and a natural frequency of the rotor system may become coincident with the oil film frequency (average oil speed in rpm/60). The system described herein may addresses the reduction of all typologies of oil film generated vibration.

A frequency that is synchronous with the rotational speed of the rotor corresponds to the rotational speed of the rotor (expressed in Hz). The predefined range of frequencies adjacent synchronicity may range from 0.6 to 1.0 times the rotational speed of the rotor. This is well above the typical range of measured oil-induced sub-synchronous vibrations, so that a measurement of a frequency in this band (e.g., above a certain threshold), a measurement of vibration magnitudes (e.g., of orbits) and/or a measurement of a phase allows to detect an onset of a critical synchronous vibration and the activation of counter-measures before the journal bearing is damaged. For activating counter-measures, the system may comprise one or more active means, in particular to decrease the pressure and/or increase the temperature of the fluid in the clearance, e.g., by one or more predefined steps. One or more thresholds may be determined based on a maximum allowable clearance. For example, a deflection of 30%, 40% or 50% (or a value in between two of these values) of the maximum clearance may define the threshold.

Optionally, the control system is further adapted to determine that the vibration comprises a frequency that is sub-synchronous with the rotational speed within a predefined range of relative frequencies. By this, a transition from a sub-synchronous instability to a synchronous critical and instable vibration may be detected.

According to an embodiment, the predefined range of relative frequencies is 0.3 to 0.5 times the rotational speed of the rotor. This range has been found to allow an early and reliable determination of a sub-synchronous critical oil film vibration or instability.

The control system may be further adapted to determine whether the rotor approaches synchronicity, e.g., by determining whether or not the vibration, at a first point in time, comprises a sub-synchronous frequency, and thereafter, at a second point in time, comprises a near-synchronous or synchronous frequency. This allows to detect a transition from a sub-synchronous critical vibration or instability to a, in many applications much more dangerous, synchronous critical vibration or instability. This allows to use the journal bearing at very high speeds and loads while at the same time maintaining a high level of safety.

Optionally, the control system is adapted to determine a change of a phase of the vibration, and to provide a control signal based on the change of the phase. Phase measurements allow to distinguish whether a synchronous vibration is induced by the oil film or by other causes (for instance rotor unbalance, couplings that operate out of an allowable offset and misalignment range, electrical motor distortions etc.). A change of the phase may be another signature of the onset of a synchronous critical vibration due to an oil film instability. Measuring a change of the phase allows to strongly improve the significance of the measurement. A synchronous vibration indicates a vibration that is periodic with the same frequency of the rotor. A synchronous vibration can present a different phase trend upon the different causes that may generate it. The control system may be adapted to determine a phase trend of a synchronous vibration, and, optionally, to initiate counter-measures in dependence of the determined phase trend.

In an embodiment, the control system is adapted to provide the control signal when the determined change of the phase versus speed and/or power within a predefined period of time is larger than a predefined threshold. This may comprise a trend analysis of the phase measurements. Also, a trend analysis on magnitudes of FFT vibration components may be carried out by the control system, in particular at relevant (e.g., predefined) frequencies (at which oil film vibration is expected to appear, e.g., by analytical and/or FEM calculations for a given journal bearing design). This analysis may be continuously carried out and/or the results compared with a look-up table of thresholds based on the radial and/or axial clearances. In this manner, the risk of a metal-to-metal contact may be noticeably reduced by means of an active controlled action taking place (described further below). An example threshold is a radial displacement of a journal shaft of the journal bearing becomes 70% of the radial clearance of the bearing or of the system stack-up.

Optionally, the control system is adapted to provide a control signal upon determining that the vibration comprises a frequency that is synchronous, near-synchronous, and/or approaching synchronicity. According to an embodiment, the control signal is provided only if more than one prerequisite is met, e.g., first the determination that the vibration comprises a frequency that is synchronous, near-synchronous, and/or approaching synchronicity, and second, the determination of a change of the phase versus speed and/or power.

Other alternatives for counteracting an oil film critical vibration or instability is to decrease the power, torque and/or speed of the journal bearing with the effect of reducing the centrifugal and torque loads. However, this has an impact on the operation of the journal bearing, potentially limiting an operative envelope (e.g., of an aircraft having the journal bearing) which does not comply with (e.g., airframe) requirements. On the other hand, a (limited) change of the pressure and/or temperature of the journal bearing oil film is possible without an impact on the operation. In addition, reducing the pressure can be effected very quickly. In particular in the field of gas turbines, and even more particular in the field of gas turbine engines for aircrafts, this is of particular relevance. It is further worth noting that another conceivable counter-measure is to exert a force on the journal bearing with the frequency of the vibration but in opposite direction, however, this increases the stress on the journal bearing and does not address the source of the vibration, which is the oil. It is worth noting that in journal bearings with rotating axes (e.g., planet journal bearings with a rotating carrier), also Coriolis forces have an effect.

According to an embodiment the rotor is a planet of an epicyclic gearbox, and the carrier is a planet carrier of the epicyclic gearbox. In some applications, planets in epicyclic gearboxes are rotated at very high speeds and under high loads. Therefore, the system described herein is particularly beneficial for epicyclic gearboxes. In particular when the carrier is rotatably mounted (but also when the carrier is fixed), an average oil film may be used to determine vibration signals. In general, when the carrier is rotatably mounted, its motion relative to a fixture may be taken into account in the generations and/or analysis of the vibration signal.

According to an aspect, a gas turbine engine for an aircraft is provided, comprising an epicyclic gearbox, the system of any aspect or embodiment described herein, wherein the journal bearing is a journal bearing of the epicyclic gearbox, an engine core comprising a turbine, a compressor, and a core shaft connecting the turbine to the compressor; and a fan located upstream of the engine core, the fan comprising a plurality of fan blades; wherein the epicyclic gearbox receives an input from the core shaft and outputs drive to the fan so as to drive the fan at a lower rotational speed than the core shaft.

It may be provided that the turbine is a first turbine, the compressor is a first compressor, and the core shaft is a first core shaft; the engine core further comprises a second turbine, a second compressor, and a second core shaft connecting the second turbine to the second compressor; and the second turbine, second compressor, and second core shaft are arranged to rotate at a higher rotational speed than the first core shaft.

According to an aspect, a method for controlling a journal bearing is provided, wherein the journal bearing has a carrier, a rotor arranged rotatable about a rotational axis relative to the carrier, and a fluid in a clearance between the rotor and the carrier. The method comprises the steps of: measuring a vibration signal of the rotor; determining a pressure set point for the fluid in the clearance based on the vibration signal; providing control signals based on the pressure set point, in particular as an output of a feedback control loop using a pressure value and/or a vibration signal as feedback parameter; and modifying, using an active means, the pressure of the fluid in the clearance based on the control signals.

Therein the pressure set point is one of a set of predefined pressure set points.

All predefined pressure set points of the set of predefined pressure set points may be between a minimum pressure value and a maximum pressure value. Therein, the minimum pressure value and the maximum pressure value may be determined based on the rotational speed.

The active means may be an adjustable valve, in particular a servo valve.

According to an aspect, a method for monitoring a journal bearing is provided, wherein the journal bearing has a carrier, a rotor arranged rotatable about a rotational axis relative to the carrier, and a fluid in a clearance between the rotor and the carrier. The method comprises the steps of: determining a rotational speed of the rotor relative to the carrier; measuring a vibration of the rotor; and determining whether or not the vibration of the rotor comprises a frequency that is synchronous with the rotational speed, or near-synchronous within a predefined range of frequencies adjacent synchronicity with the rotational speed. The method may further comprise determining a change of a phase of the vibration, in particular versus speed and/or power (of the rotor), and/or measuring the pressure and/or temperature of the fluid in the clearance.

According to an aspect a method is provided, in particular in accordance with the method as described hereinbefore, the method being for detuning a vibration of a rotor of a journal bearing, the journal bearing having a carrier, the rotor arranged rotatable about a rotational axis relative to the carrier, and a fluid in a clearance between the rotor and the carrier. The method comprises (optionally: determining a rotational speed of the rotor relative to the carrier) measuring a vibration of the rotor and, optionally, of the carrier (when the carrier is rotating); providing a control signal when the vibration comprises a frequency that is in a predefined range relative to the rotational speed and/or providing a control signal when the vibration has an amplitude above a predefined threshold; and decreasing the pressure and/or increasing the temperature of the fluid in the clearance by one or more predefined steps in response to the provision of the control signal. The method may further comprise determining a change of a phase of the vibration, in particular versus speed and/or power (of the rotor), and/or measuring the pressure and/or temperature of the fluid in the clearance.

As noted elsewhere herein, the present disclosure relates to a gas turbine engine. Such a gas turbine engine may comprise an engine core comprising a turbine, a combustor, a compressor, and a core shaft operatively connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity Utip. The work done by the fan blades on the flow results in an enthalpy rise dH of the flow. A fan tip loading may be defined as $dH/Utip^2$, where dH is the enthalpy rise (for example the 1-D average enthalpy rise) across the fan and Utip is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 Nkg-1 s, 105 Nkg-1 s, 100 Nkg-1 s, 95 Nkg-1 s, 90 Nkg-1 s, 85 Nkg-1 s or 80 Nkg-1 s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the schematic Figures, in which:

FIG. 2A to 2C show a rotor of a journal bearing in different positions during a motion relative to a carrier;

FIG. 3 shows an oil film instability of a journal bearing;

FIG. 4 depicts a possible trigger for driving an oil film instability;

FIGS. 7A and 7B show details of a journal bearing with a rotating carrier;

DETAILED DESCRIPTION

Figure 1A:
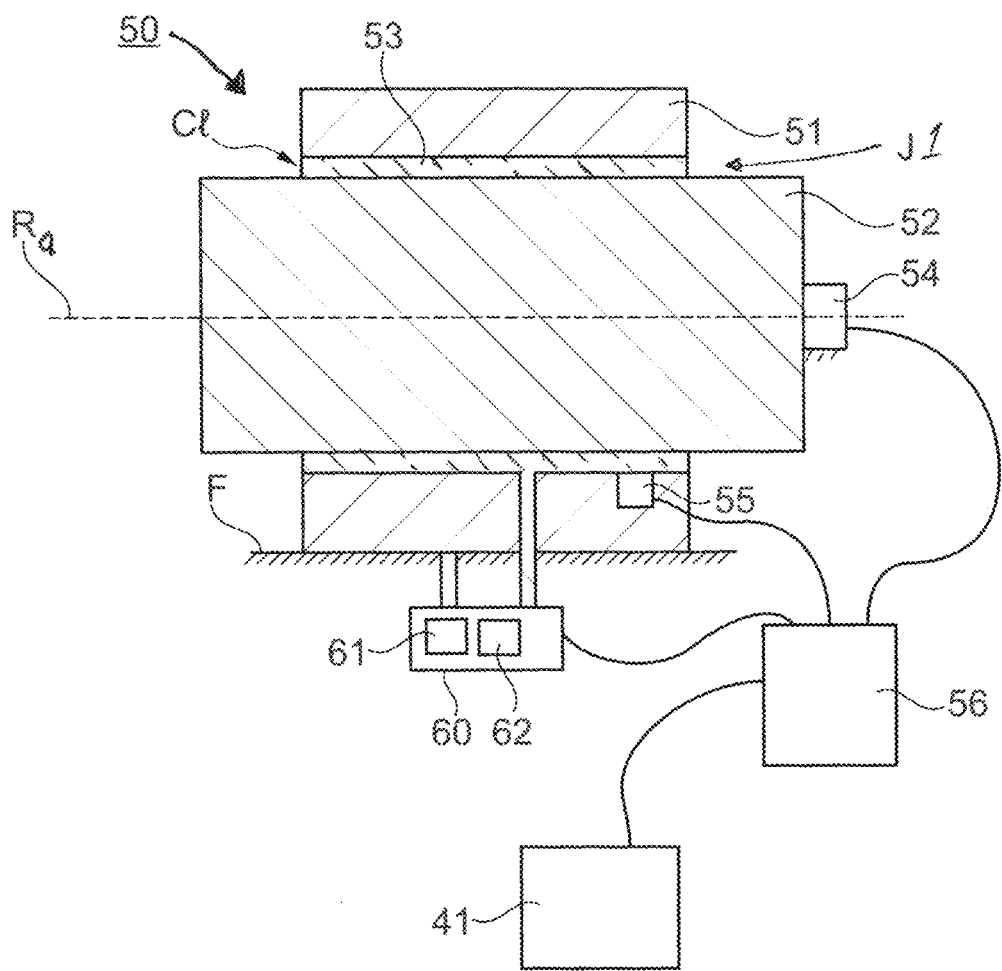
FIG. 1A shows a system for controlling a journal bearing.

FIG. 1A shows a system 50 with a journal bearing J1. The journal bearing J1 comprises a carrier 51 and a rotor 52 arranged so as to be rotatable about a rotational axis Ra relative to the carrier 51. In the example of FIG. 1A, the carrier 51 is fixed to a stationary fixture F and may thus also be referred to a stator. The carrier 51 forms a receptacle in which the rotor 52 is rotatably accommodated. While in this example the carrier 51 surrounds the rotor 52, however, in other examples the configuration is vice versa and the rotor surrounds the carrier.

Between the rotor 52 and the carrier 51 there is a clearance Cl. In other words, the inner diameter of the carrier 51 receptacle is larger than the outer diameter of the rotor 52. The clearance Cl is filled up with a fluid. The fluid acts a lubricant. In the present example, the fluid is an oil 53.

An oil system 60 supplies the oil 53 to the journal bearing J1. The oil system 60 comprises an oil tank and an oil pump, or is connected to an oil tank and/or an oil pump. The oil system 60 is generally adapted to adjust at least one property of the oil 53 in the clearance Cl, in particular the pressure and, optionally, the temperature of the oil 53 in the clearance Cl. In the example shown in FIG. 1A, at least one valve, more precisely, a servo valve 62, is adjustable to control the pressure of the oil 53 in the clearance Cl, but also other means are conceivable for this purpose. The oil system 60 of the example shown in FIG. 1A further comprises an (optional) oil cooler 61 which is adjustable to control the temperature of the oil 53 in the clearance Cl.

The system 50 further comprises a speed sensor 54 as a means to determine the rotational speed of the rotor 52 relative to the carrier 51, and at least one vibration sensor 55 to measure a vibration of the rotor 52. The at least one vibration sensor 55 may be or comprise, e.g., at least one proximity sensor. The vibration (e.g., of an orbiting motion) of the rotor 52 can be measured by one or more sensor(s) grounded (mounted on a fixed frame) or by one or more sensors rotating with the rotor 51 (e.g., via a telemetry system). Alternatively or in addition, the at least one vibration sensor 55 may be or comprise at least one accelerometer. The one or more accelerometers may, e.g., be mounted on the carrier 51. The system 50 may further comprise at least one phase measuring sensor (e.g., sensor 55 may be configured accordingly), oil feed pressure determining means (performing a measurement and/or calculating by means of a look up table) and/or at least one device for measuring an oil temperature, engine speed, torque and/or power (or for determining it, e.g., form an engine FADEC).

Furthermore, the system 50 comprises a control system 56. The control system 56 is coupled to the speed sensor 54 and the at least one vibration sensor 55 so as to receive sensor signals therefrom. The control system 56 is adapted to determine whether or not the vibration of the rotor 52, measured by means of the at least one vibration sensor 55, comprises a frequency that is synchronous with the rotational speed, or near-synchronous within a predefined range of frequencies adjacent synchronicity with the rotational speed of the rotor 52 relative to the carrier 51, e.g., equal to or larger than 0.6 and smaller than or equal to 1.0 times the rotational speed in Hz. In particular, the control system 56 may be adapted to perform a Fourier analysis (in particular an FFT analysis) to determine the frequency of the vibration; however, this analysis may alternatively be performed externally from the control system 56. In the latter case the control system 56 may receive as an input one or more analog or digital signals.

The control system 56 may be adapted such that a change of a magnitude or of a state triggers an oil pressure regulation (in particular by decreasing the pressure stepwise). A temperature regulation may also be performed.

The control system 56 is adapted so as to determine a pressure set point for the fluid 53 in the clearance Cl based on the vibration signal from the vibration sensor, and to provide control signals to the active means 62 that may be generated based on an output of a feedback control loop using a pressure value and/or a vibration signal as feedback parameter. This determination of the pressure set point and/or the provision of the control signals to the active means 62 so as to adjust the pressure to the set point may particularly be performed by the control system 56 in response to the determination that the vibration of the rotor 52, measured by means of the at least one vibration sensor 55, comprises a frequency that is synchronous with the rotational speed, or near-synchronous within a predefined range of frequencies adjacent synchronicity with the rotational speed of the rotor 52 relative to the carrier 51.

It is worth mentioning that the vibration signal of the rotor 52 corresponds to a motion of the oil film at orbits. Optionally, the average oil speed is determined to be within 0.6 times the rotor 52 speed and 1.0 times the rotor speed.

As mentioned, in case that the control system 56 determines that the vibration of the rotor 52 comprises a frequency that is synchronous or near-synchronous, the control system 56 initiates countermeasures. To this purpose, the control system 56 determines the pressure set point and generates the control signals, and provides the control signals to one or more recipients. In the present example, the control system 56 is communicatively connected with the oil system 60 and with another controller 41. The other controller 41 is adapted to modify the rotational speed of the rotor 52 and/or the torque acting on the journal bearing J1. For example, in a gas turbine engine application, the controller may be an engine controller that is adapted to change the position of variable vanes and/or a fuel flow.

Depending on the control signals of the control system 56, e.g., the oil system 60 may reduce the oil pressure and, optionally, increase the oil temperature. This change of the oil pressure (optionally, also of the temperature) is performed in predefined discrete steps. After performing a change by a predefined discrete step, the control system may be adapted to monitor the effect of the change on the oil 53 stability. Optionally, the control system 56 is adapted to wait for a predefined time before providing another control signal to make another change.

It is worth noting that the vibration analysis may be based on an identification and order tracking of the frequencies at which the rotor can travel the orbits that are induced by oil film dynamic loads. These may be calculated for all the possible conditions of an oil film instability that a given journal bearing design can encounter.

Optionally, natural frequencies of one or more of the journal bearing J1 components may be stored in a look-up table, optionally versus speed and/or torque, and provided to the control system for analysis with the vibration signals.

Optionally, the control system 56 performs a phase analysis, particularly extract a phase lag or phase lead between one or more orbits of the oil film and a fixed reference position on the rotor 52. The phase analysis may be carried out in particular on oil film (key indicator) frequencies, alternatively or in addition on other harmonic and/or sub-harmonic frequencies that allow to define the position of the rotor.

Figure 1B:
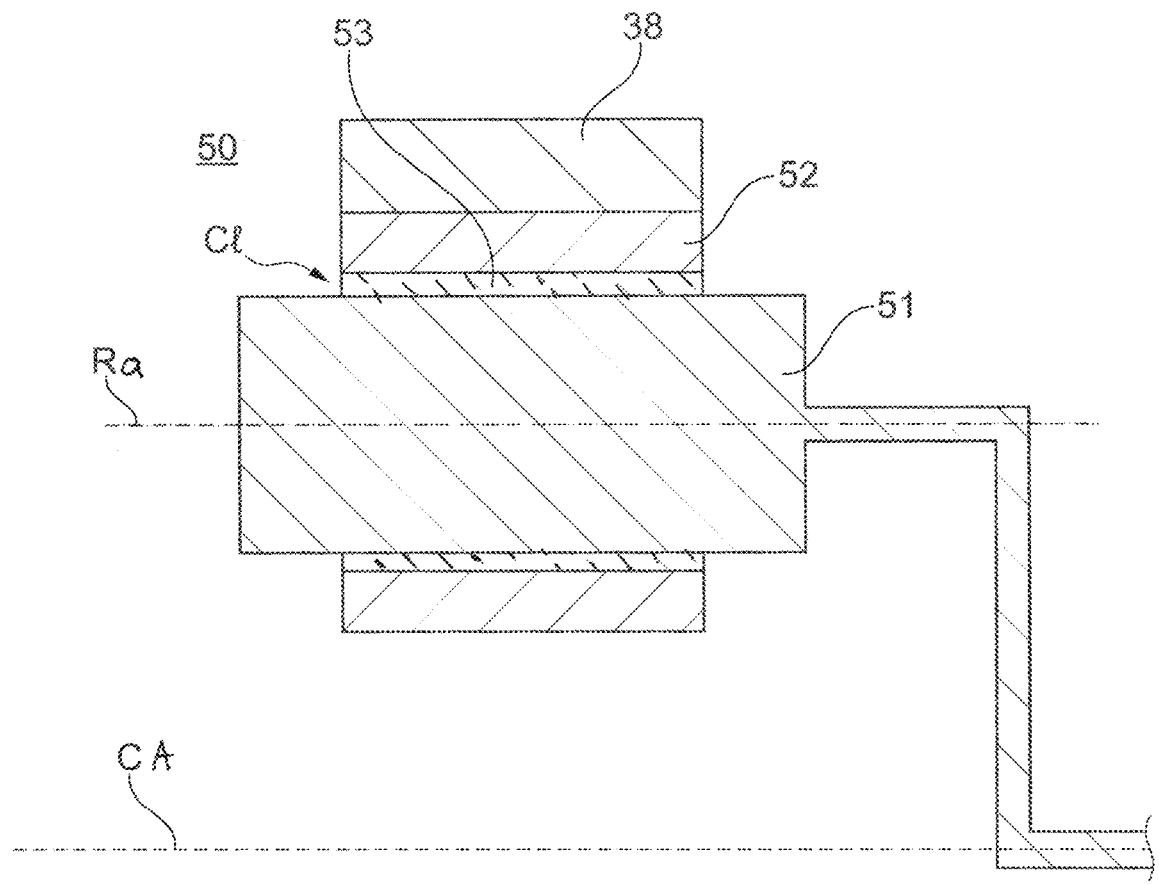
FIG. 1B shows another journal bearing.

FIG. 1B shows another configuration of a journal bearing that may be used in the system 50 of FIG. 1A (the other components of the system are not shown in FIG. 1B for simplicity). According to FIG. 1B, the carrier 51 is inserted in a receptacle of the rotor 52. The rotor 52 thus encompasses the carrier 51. In this example, the carrier 51 has a pin.

In the example of FIG. 1B, the carrier 51 is a part of a carrier device. The carrier device may comprise more than one carrier 51, e.g., three, four or five carriers 51. The rotor 52 in this example has outer teeth that mesh with another gear, in the present case a ring gear 38. The ring gear 38 extends coaxially around a central axis CA.

The carrier device is mounted rotatable about the central axis CA (e.g., with respect to the ring gear 38), but other configurations are possible where the carrier device is fixed (e.g., with respect to a mount or a casing for the journal bearing).

FIG. 2A to 2C show the carrier 51 and the rotor 52 of the journal bearing J1 of FIG. 1A in views along the rotational axis Ra. FIG. 2A shows a state in which the rotor 52 is not in motion relative to the carrier 51. The rotor 52 is arranged symmetrically in the center of the carrier 51, so that the width of the clearance Cl is substantially constant around the rotor 52. The radius Rex from the rotational axis Ra to the inner surface of the carrier 51 is the sum of the nominal width C of the clearance Cl and the radius R of the rotor 52, Rex=R+C (in a coaxial arrangement this holds for all angles around the rotational axis Ra). It is worth noting that the figures are schematic and, e.g., the clearance Cl is shown enlarged for the purpose of illustration.

When the rotor 52 is rotated about its rotational axis Ra and experiences a radial load, the oil 53 film in the clearance Cl exerts a hydrodynamic pressure on the sliding surface of the rotor 52, and the rotor 52 is forced into an eccentric arrangement relative to the carrier 51, as shown in FIGS. 2B and 2C. FIG. 2B illustrates the distribution of the pressure, and indicates a location of maximum pressure P max, which follows the location of the minimum oil film thickness h min. The minimum oil film thickness h min is calculated by means of the nominal width C of the clearance Cl and the eccentricity c as h min=C(1−ε). At each angle θ with respect to the angle of the eccentricity c around the rotational axis Ra, the oil film thickness can generally be calculated as h(θ)=C(1+ε·cos θ).

FIG. 3 illustrates the position of a point on the rotor 52 in a plane perpendicular to the rotational axis Ra. The diagram indicates the respective positions over a period of time. A cloud of points with relatively small variations correspond to a stable operation of the journal bearing J1. However, at certain operating conditions, particularly at high speeds, the oil film can become unstable and this instability may lead to an instantaneous transition to an unstable operation of the journal bearing J1, wherein the rotor 52 moves with much stronger deflections. At this unstable operation, the rotor 52 follows an orbit that can lead to a material contact of the surfaces of the rotor 52 and the carrier 51. As a result, strong wear, or even a failure of the journal bearing J1 may be the consequence.

Various parameters have an impact on the onset of an unstable operation, particularly speed, but also load, oil viscosity, external vibrations, and a tilting of the rotor 52, such as shown in FIG. 4.

When only amplitudes of a vibration of the rotor 52 are monitored, in some cases the reaction time may be too slow and, e.g., when the speed is reduced or even stopped, the journal bearing could already be damaged. In addition, amplitudes per se may be not reliable enough for the detection of an oil film instability in some applications.

It has turned out, however, that by monitoring specific predefined frequencies, in particular ranges of frequencies of vibrations of the rotor 52, it is possible to detect an onset of an oil film instability in a very reliable and quick manner. A particularly decisive indication is a detection of a synchronous or near-synchronous vibration of the rotor 51. A particularly effective interval for near-synchronous frequencies is 0.6 to 1.0 times the rotational speed of the rotor 52 (in Hz). A detection of such a vibration allows to quickly react so as to disturb the oil film instability and to avoid wear or even failure of the journal bearing.

The precision of the detection of oil film instabilities can be even further improved by monitoring whether the vibration of the rotor 52 comprises, at a first point in time, a sub-synchronous vibration in the range of 0.3 to 0.5 times the rotational speed of the rotor 52 (in Hz), and, at a second point in time after the first point in time, comprises a near-synchronous or synchronous frequency. By detecting such vibrations in this order, a particularly quick and effective triggering of countermeasures becomes possible.

Figure 5A:
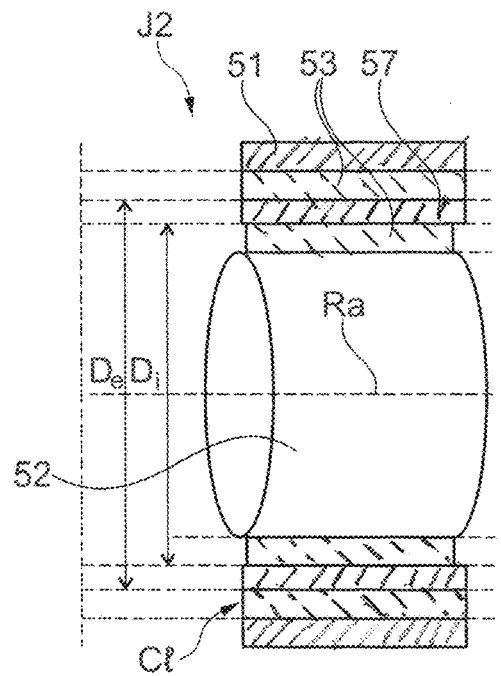
FIGS. 5A, 5B and 5C show different views of a free-floating journal bearing.
Figure 5C:
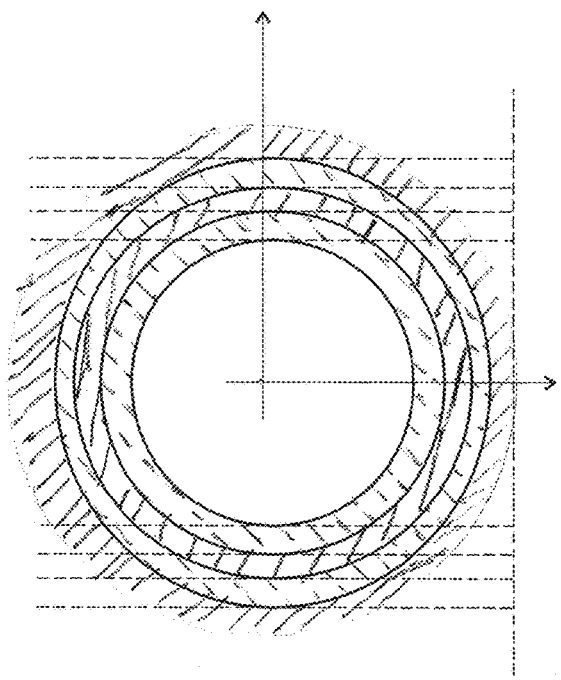
Figure 5B:
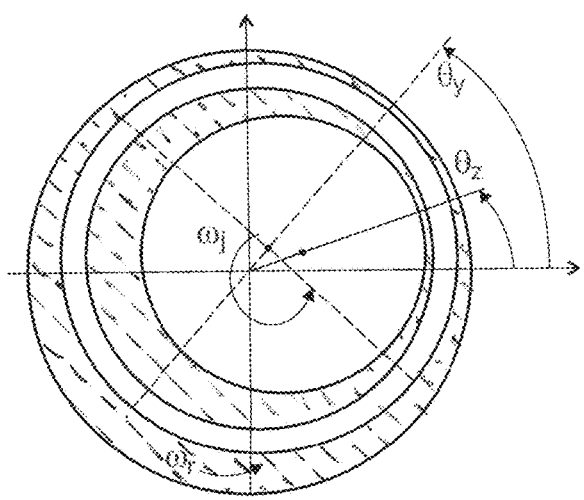

FIGS. 5A, 5B and 5C show another type of a journal bearing that can be used in the system 50 of FIG. 1A. The journal bearing J2 has a free-floating ring 57. Such journals are particularly suitable for high speed applications, because the interposition of the ring 57 in the clearance Cl allows to increase the width of the clearance.

As shown in FIGS. 5A and 5C, the journal bearing J2 comprises two oil films, one on either side of the ring 57. An outer one of the oil films 53 is delimited by the carrier 51 (the inner surface thereof) and an outer surface of the ring 57, the outer surface of the ring 57 having a diameter, denoted as external diameter De. An inner one of the oil films 53 is delimited by the rotor 52 (the outer surface thereof) and an inner surface of the ring 57, said inner surface of the ring 57 having a diameter, denoted as inner diameter Di.

When the rotor 52 rotates relative to the carrier 51, the ring is also driven in a rotary motion. In FIG. 5B the angular velocity of the rotor 52, i.e., journal, is denoted as $\omega j$. The angular velocity of the ring 57 is denoted as $\omega r$. Therein, $\omega j > \omega r$. The angles $\theta z$ of the rotor 52, and $\theta y$ of the ring 57 denote the respective angular displacement with respect to a fixed reference frame of the carrier 51. As can be seen from FIG. 5B showing the journal bearing J2 in rotation, $\theta z$ and $\theta y$ are different. More specifically, $\theta y > \theta z$.

Figure 6B:
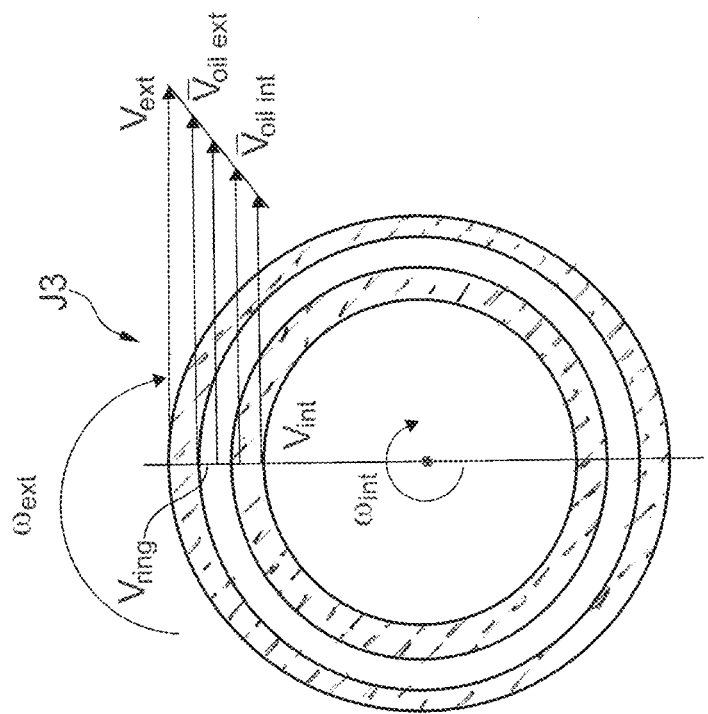
FIGS. 6A and 6B illustrate tangential oil film velocities in a free-floating journal bearing.
Figure 6A:
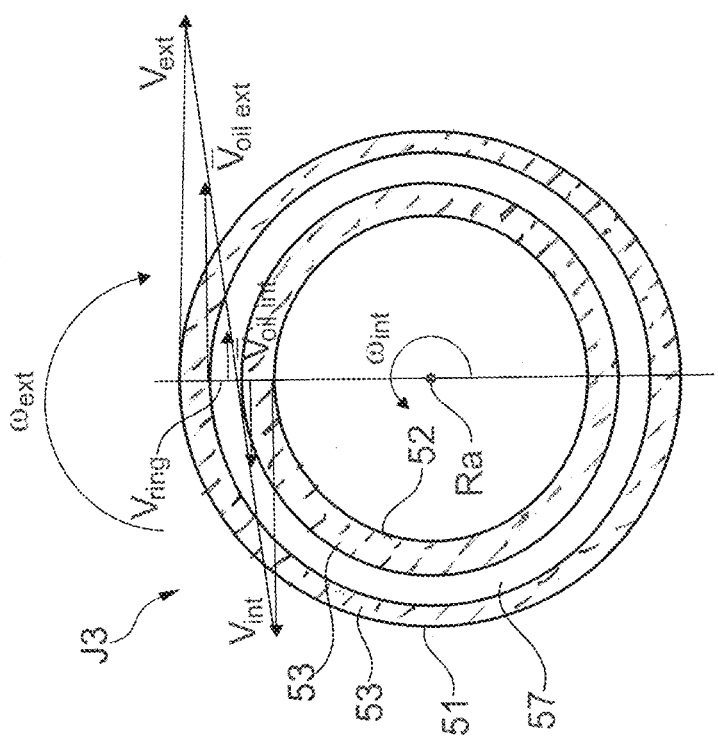

FIGS. 6A and 6B show another journal bearing J3 that can be used in the system 50 of FIG. 1A. The journal bearing J3 has a carrier 51, a rotor 52 and a free-floating ring 57 therebetween, as well as oil films 53 between the carrier 51 and the ring 57, and the ring 57 and the rotor 52, respectively. In the case of the journal bearing of FIGS. 6A and 6B, both the rotor 52 and the carrier 51 are rotatably mounted with respect to a fixed structure. FIG. 6A shows an example where the rotor 52 rotates at speed ωint, and the carrier 51 rotates at speed ωext, wherein ωint and ωext have opposite directions. FIG. 6A further shows the tangential velocities of the rotor 52, denoted as Vint, of the ring 57, denoted as Vring, and of the carrier 51, denoted as Vext, all with respect to the fixed structure as reference. Further, average tangential velocities of the oil films are indicated and denoted as $\overline{V}$oil ext, and as $\overline{V}$oil int, for the outer and inner oil film 53, respectively.

As can be seen in FIG. 6A, The average tangential oil film velocities and the tangential ring velocity can be determined based on the tangential velocities of the carrier 51 and the rotor 52, in the present example by means of an auxiliary line constructed by means of the vectors of the tangential velocities of the carrier 51 and the rotor 52. The control system 56 (see FIG. 1A) may be adapted to calculate the tangential velocities of the rotor 52 and/or the carrier 51 (if rotatable). It may further be adapted to determine the tangential velocity of the ring 57 and/or the average tangential velocities of the oil films 53, e.g., by use of the auxiliary line. Therein, the vectors of the (average) tangential velocities Vint, $\overline{V}$oil int, Vring, $\overline{V}$oil ext, Vext are constructed upon the same radial line with respect to the rotational axis Ra.

FIG. 6B shows another example where both the carrier 51 and the rotor 52 of the journal bearing J3 rotate in the same direction. As a result, all tangential velocities (of the carrier 51, the rotor 52 and the ring 57, and, in average, of the oil rings 53) point into the same direction.

It is worth noting that the triangles of velocity describe the kinematic field of motion which the oil film undergoes. The velocity distribution within the oil film may be determined by the system using the Navier Stokes equations. This may account for the radial gap distribution in tangential direction, feed pressure, load magnitude and direction, temperature, Reynold's number, oil viscosity, speed values, Coriolis forces if present, and/or the superimposed displacement due to vibration. For a given journal bearing design the average oil film velocity may be calculated (optionally versus speed and torque, oil feed pressure and/or oil temperature). The condition monitoring may use a look up table that defines frequency ranges in which oil film vibration and instability may appear during operations.

FIGS. 7A and 7B depict another journal bearing J4 that can be used in the system 50 of FIG. 1A. The journal bearing J4 comprises a carrier 51 having an outer surface that carries a rotor 52. That is, in contrast to, e.g., the journal baring J1 of FIG. 1A, in the journal bearing J4 of FIGS. 7A and 7B the rotor 52 surrounds the carrier 51 (or the portion of the carrier on which the rotor is mounted). Further, the rotor 52 of the journal bearing J4 is a gear wheel. The rotor 52 is engaged with a sun gear 58. That is, when the sun gear 58 rotates around a principle axis of rotation, also the rotor 52 rotates. In addition, the carrier 51 is also rotatable around the principle axis of rotation.

FIG. 7A shows as the larger arrows the tangential velocities at two opposing points on the outer surface of the rotor 52, which correspondingly point in opposite directions and have the same length. Dashed arrows indicate the tangential velocity of the carrier 51, which rotates counterclockwise in this example. FIG. 7B illustrates a possibility to determine average oil film velocities by means of an auxiliary line.

The control system 56 of the system 50 according to FIG. 1A may comprise one or more control components for performing the analysis of the vibration signals of the vibration sensor 55, and, optionally, also of further signals. Alternatively or in addition, one or more controller components may receive preprocessed signals that already contain a result of a vibration analysis.

Optionally, a sensor may be arranged to determine vibration signals by measuring rotor 52 displacements with respect to the carrier 51. Alternatively or in addition, a sensor may be arranged to determine vibration signals by measuring carrier 51 displacements with respect to another component relative to which the carrier 51 is rotatable. Optionally, displacements of the carrier 51 may be determined by means of telemetry.

In particular for journal bearings with a rotating carrier 51, such as journal bearing J4, the control system 56 may be adapted to detect an oil film instability based on the tangential velocity of the oil in the clearance Cl. Using the tangential velocity and the rotations per minute of the rotor 52 and/or the carrier 51 (translated into Hz), a frequency may be determined as vibration signal that is to be analyzed for sub-synchronous and/or (near-) synchronous frequencies.

FIG. 7A shows the tangential velocity that results from the superposition of both carrier 51 and rotor 52 tangential velocity.

FIG. 7B shows the distribution of the tangential velocity only due to the carrier 51 rotation about its central axis CA of rotation.

The oil film average kinematic velocity as measured by a non-rotating vibration sensor (e.g., in a fixed reference frame) may be obtained by the system by determining the vectorial sum between rotor 52 speed relative to carrier 51 and carrier dragging effect. If a precession motion is generated by the oil film force, then the sense of the carrier orbit due to the precession may increase or decrease the measured oil film frequency of a factor equal to carrier (one per revolution) frequency. The control system 56 may be adapted to determine whether this is the case. It is worth noting that the average oil film speed that is obtained from the kinematic velocity triangles is an approximation, but provides an indication of the expected value of the oil induced vibration frequency according to which the monitoring system can set up the frequency range of interest.

Figure 8:
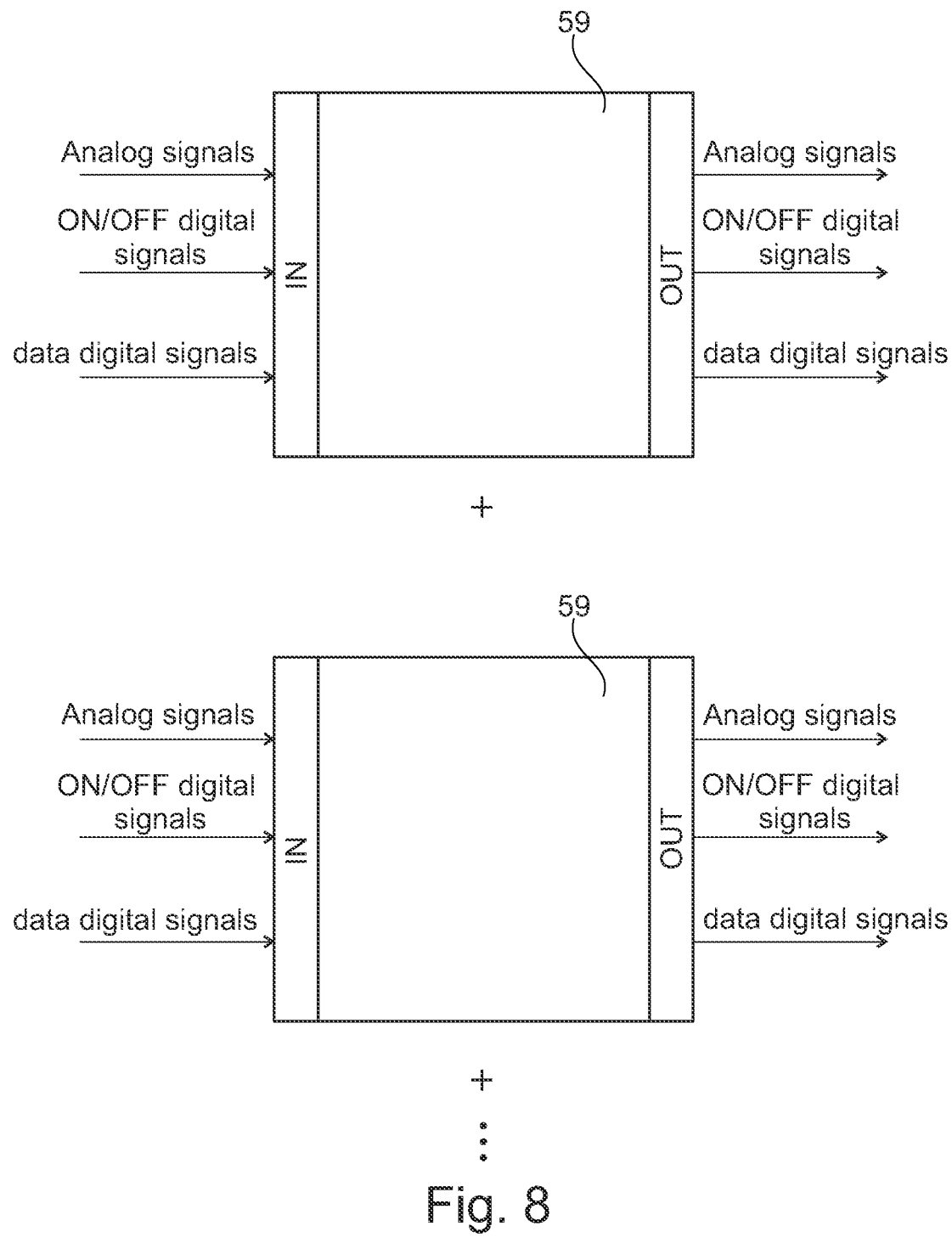
FIG. 8 shows a block diagram of a controller of the system for controlling a journal bearing.

FIG. 8 shows a plurality of corresponding controller components 59, which may be based, e.g., on an 8 bit architecture. Each controller component comprises inputs and outputs. In the present example, the inputs comprise analog signal inputs, ON/OFF-type digital signal inputs, and data digital inputs. In general, a controller component 59 comprises one or more of these inputs. For example, a given controller component may receive a voltage signal at the analog input. As an example, the voltage signal may be provided by the servo valve 62 of the oil system 60 (see FIG. 1A) as a pressure value feedback parameter, or any other servo valve of the system 50. A temperature reading, e.g. an oil temperature reading, may also be provided as an analog signal an analog input. Alternatively, signals, such as the temperature signal, may also be provided via the data digital signal input, for example when a temperature sensor (e.g. of the oil system 60) provides temperature data as digital signals. Further signals may be, e.g., threshold-dependent signals. If another logical component of the control system 56 has, e.g., determined that the vibration of the rotor 52 comprises a frequency in the range of 0.6 to 1.0× rotational speed of the rotor 52, this logical component may be adapted to provide a digital ON signal to the corresponding input of the controller component 59, otherwise a digital OFF signal. Depending on the voltage reading of the servo valve 62 on the analog input, the signal at the ON/OFF input, and the digital temperature reading, in this example, the controller component 59 may determine whether the pressure of the oil shall be decreased and/or the temperature increased. Based thereupon, the controller component 59 may provide analog, ON/OFF digital and/or data digital signals at the corresponding outputs. Each of the outputs may be operatively connected to an input of another controller component 59 and/or to an acting means, such as the servo valve 62, to decrease pressure and/or increase temperature of the oil, and/or to command that speed and/or torque at the journal bearing has to be reduced, or can be increased.

The controller components 59 may comprise a processor and memory storing instruction that, when executed by the processor, cause the processor to perform the steps described above. Alternatively, the controller components may be purely designed as hardware.

For the analysis of the vibration signals, the control system 56 (e.g., one of the controller components 59) may be adapted to perform a frequency-domain analysis. In this regard, an FFT may be applied on the vibration signal from the one or more vibration sensors 55. Therein, the control system 56 may determine whether or not any signals (e.g., above a predefined threshold) are present in the range of 0.6 to 1.0 times the rotational speed of the rotor 52.

Optionally, a time domain trend analysis may be performed on the vibration signal. For example, an increasing amplitude may be determined, or a peakfinder algorithm may be performed to detect critical signals. Alternatively or in addition, an angular domain analysis may be performed on the vibration signal. Alternatively or in addition, a phase analysis may be performed. As an example the control system 56 may determine a change of a phase of the vibration, because a change of the phase, in particular while the speed of the rotor 52 is steady, may indicate an onset of an oil film instability. As an example, the phase may perform an instantaneous change at a resonance which, in turn, may drive an oil film instability.

In addition to the vibration sensor 55 signals, other parameters of the machine including the journal bearing J1-J4 may be analyzed by the control system 56. For example, the machine is a gas turbine engine having one, two or three shafts, each driven by a respective turbine. The journal bearing J1-J4 may be driven by one of the shafts. Speed encoders for speeds of the shafts may provide signals to the control system 56. In this case, a separate speed sensor 54 may be omitted. Further, torquemeters measuring the torque of one or more of the shafts may provide torque signals to the control system 56. Further vibration sensors for the gas turbine engine may also provide signals to the control system 56. An engine power measurement result may be provided to the control system 56. Other engine health parameters may be provided. Particularly, the journal bearing may be a part of an epicyclic gearbox for a fan of the gas turbine engine. A power loss in the gearbox may be determined and also provided as a signal to the control system 56. The control system 56 may receive one, more or all of the above signals. For the signals that the control system receives, additionally baseline condition values may be provided. Further, such baseline values may be provided versus an engine operating condition, such as speed, torque, flight altitude and/or atmospheric conditions. By means of these baseline conditions, the control system 56 may refine its analysis and, in particular, it may base the decision to increase the temperature and/or decrease the pressure of the oil thereon.

The monitoring of one or more, or all of the above signals may comprise monitoring one or more of the following: sub-synchronous instabilities, synchronous instabilities, signals that appear once per revolution of the rotor (relative to the carrier and/or a fixed frame), signals that appear twice per revolution of the rotor (relative to the carrier and/or to the fixed frame), multiple orders of a signal, sidebands of a signal, a precession velocity, harmonics in the number of rotors times speed of the rotors, the journal bearing fundamental frequency, relative to the carrier and/or to the fixed frame, the gearmesh frequency, harmonics of the rotor 52*a* and/or a hunting frequency.

Sidebands are distinct frequencies on either side of a primary frequency. Sidebands can be the result of amplitude or frequency modulation. A sideband can be used to diagnose problems with rotating machinery. It should be noted that epicyclic gearboxes (including planetary) can create apparent sidebands from the fact that the frequency of rotating forces depends on the reference frame of the observer—generally static in the engine frame. This modulation may be present also in the oil film vibration frequencies.

Figure 9:
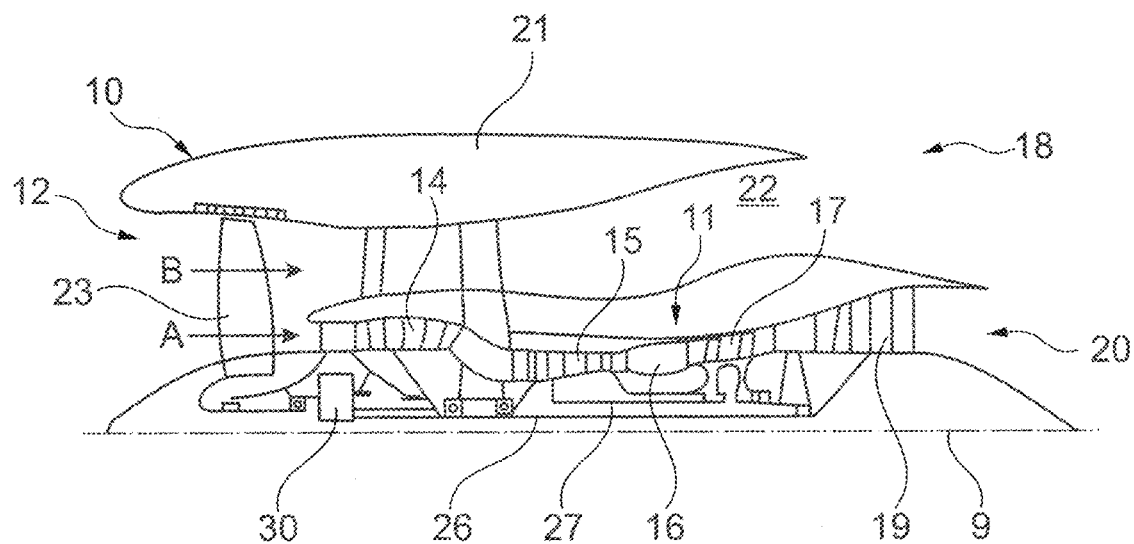
FIG. 9 is a sectional side view of a gas turbine engine.

FIG. 9 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 10:
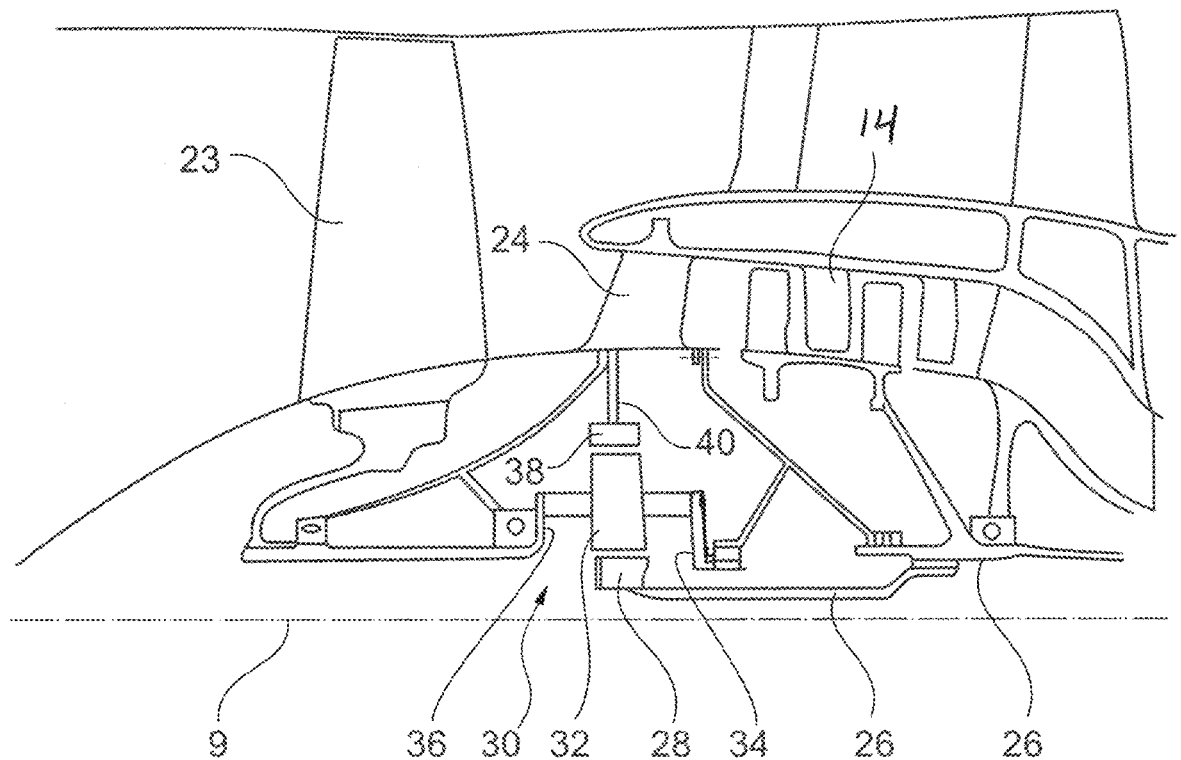
FIG. 10 is a close up sectional side view of an upstream portion of a gas turbine engine.

An exemplary arrangement for a geared fan gas turbine engine 10 is shown in FIG. 10. The low pressure turbine 19 (see FIG. 9) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 11:
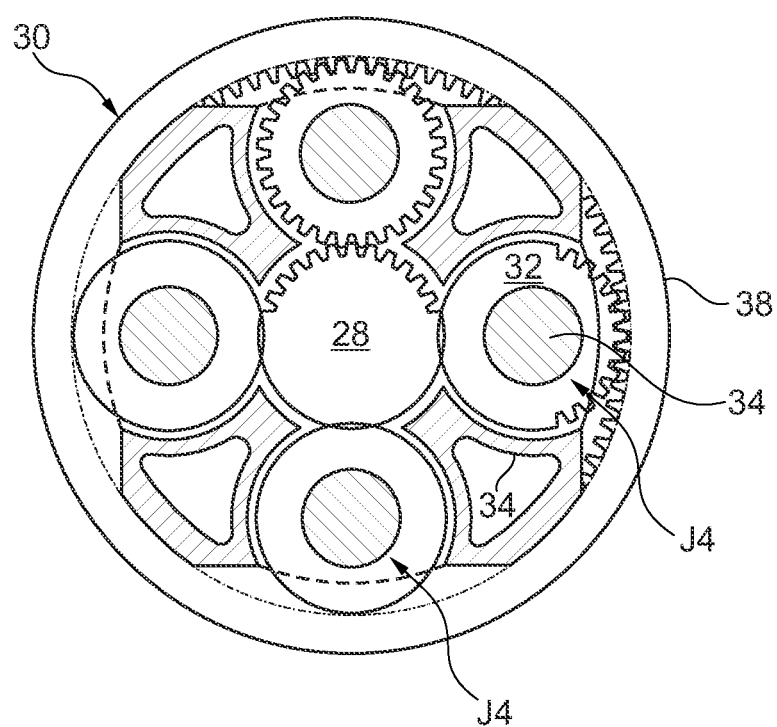
FIG. 11 is a partially cut-away view of a gearbox for a gas turbine engine.

The epicyclic gearbox 30 is shown by way of example in greater detail in FIG. 11. Each of the sun gear 28, planet gears 32 and ring gear 38 comprise teeth about their periphery to intermesh with the other gears. However, for clarity only exemplary portions of the teeth are illustrated in FIG. 11. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

Each planet gear 32 is a rotor, and each pin of the planet carrier 34 serves as a carrier that forms a journal bearing J4 with the corresponding planet gear 32. Each of these journal bearings J4 correspond to the journal bearing J4 according to FIGS. 7A and 7B.

The epicyclic gearbox 30 illustrated by way of example in FIGS. 10 and 11 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 10 and 11 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 10 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 10. For example, where the gearbox 30 has a star arrangement (described above), the skilled person would readily understand that the arrangement of output and support linkages and bearing locations would typically be different to that shown by way of example in FIG. 10.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 9 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 9), and a circumferential direction (perpendicular to the page in the FIG. 9 view). The axial, radial and circumferential directions are mutually perpendicular.

Figure 12:
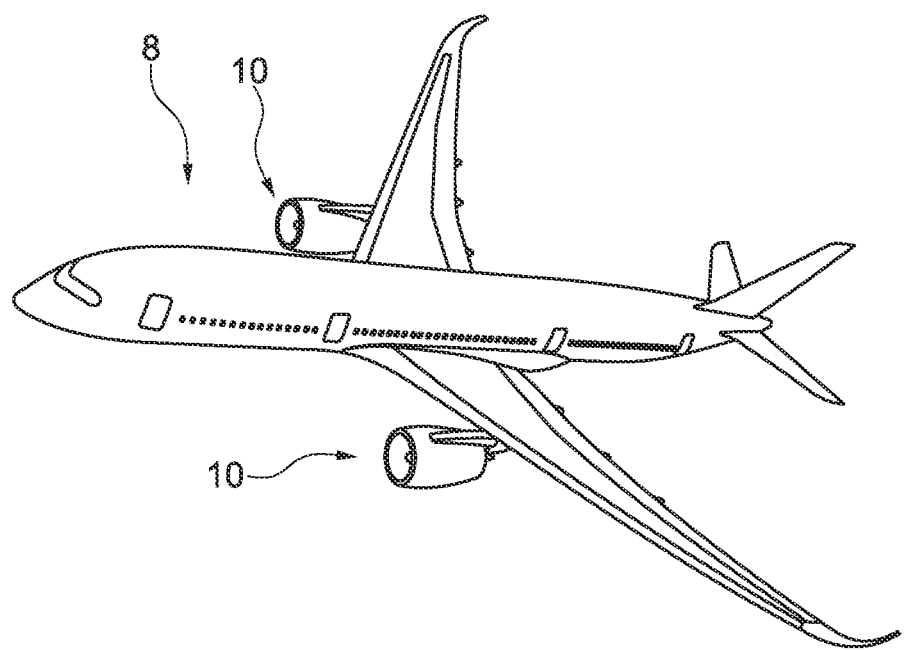
FIG. 12 is an aircraft having a plurality of gas turbine engines.

FIG. 12 shows an aircraft 8 in the form of a passenger aircraft. Aircraft 8 comprises several (i.e., two) gas turbine engines 10 in accordance with FIGS. 9 and 10.

Figure 13:
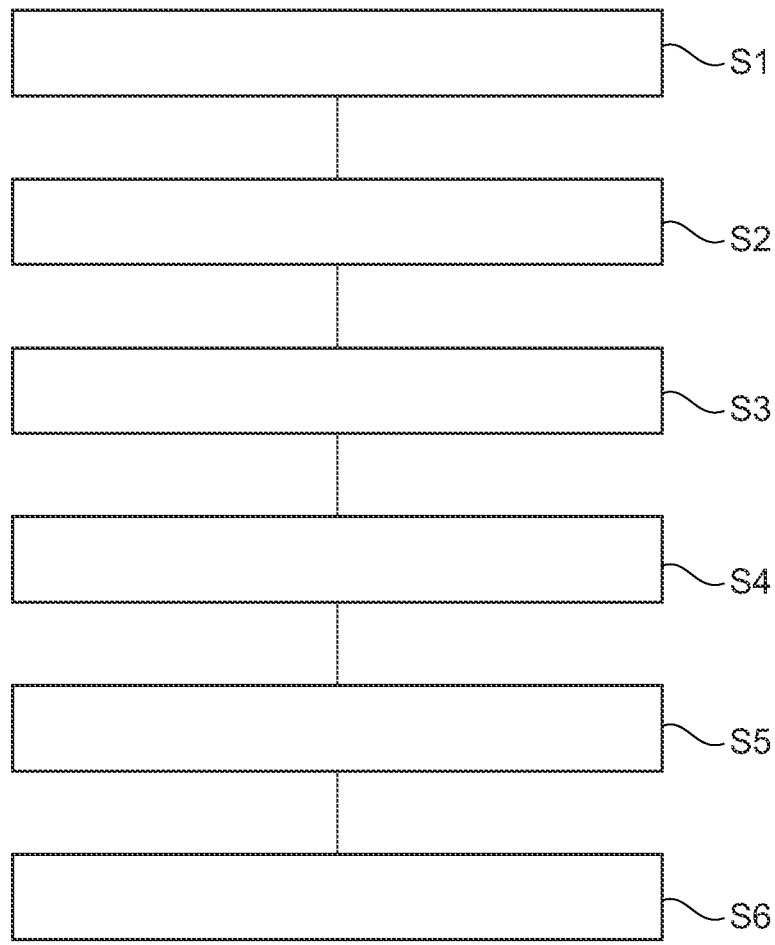
FIG. 13 is a method for controlling a journal bearing.

FIG. 13 shows a method for monitoring and controlling a journal bearing, in particular for counteracting an instability of the journal bearing, wherein the method comprises the following steps:

Step S1: providing a journal bearing J1-J4 having a carrier 34; 51, a rotor 32; 52 arranged rotatable about a rotational axis Ra relative to the carrier 34; 51, and a fluid 53 in a clearance Cl between the rotor 32; 52 and the carrier 34; 51.

Step S2: optionally, determining a rotational speed of the rotor 32; 52 relative to the carrier 34; 51.

Step S3: measuring a vibration signal of the rotor 32; 52.

Step S4: determining a pressure set point for the fluid 53 in the clearance Cl based on the vibration signal (and, optionally, based on the rotational speed). This may comprise determining whether or not the vibration of the rotor 32; 52 comprises a frequency that is synchronous with the rotational speed, or near-synchronous within a predefined range of frequencies adjacent synchronicity with the rotational speed, and, optionally, the determination of a difference between a target vibration signal and a real-time signal, wherein the pressure set point may be selected among a plurality of predefined pressure set points. This selection may particularly be based on the determined difference.

Step S5: providing control signals based on the determined pressure set point. For example, the control signals may be provided as an output or by means of an output of a feedback control loop using a pressure value and/or a vibration signal as feedback parameter, and the selected set point as the target value. Alternatively or in addition, step S5 comprises providing a control signal when the vibration comprises a frequency that is in a predefined range relative to the rotational speed. Optionally, the control signal is only provided when additionally a trend is detected in the vibration frequencies. This may be performed by monitoring time histories of vibration signals and/or a sideband analysis.

Step S6: modifying, using an active means 62, the pressure of the fluid 53 in the clearance Cl based on the control signals. This may be performed, e.g., by decreasing the pressure in accordance with the selected set point and, optionally, by increasing the temperature of the fluid 53 in the clearance Cl by one or more predefined steps in response to the provision of the control signal. Optionally, additional feedback signals are provided to control further parameters, e.g., an operating parameter of a gas turbine engine comprising the journal bearing J1-J4.

Figure 14:
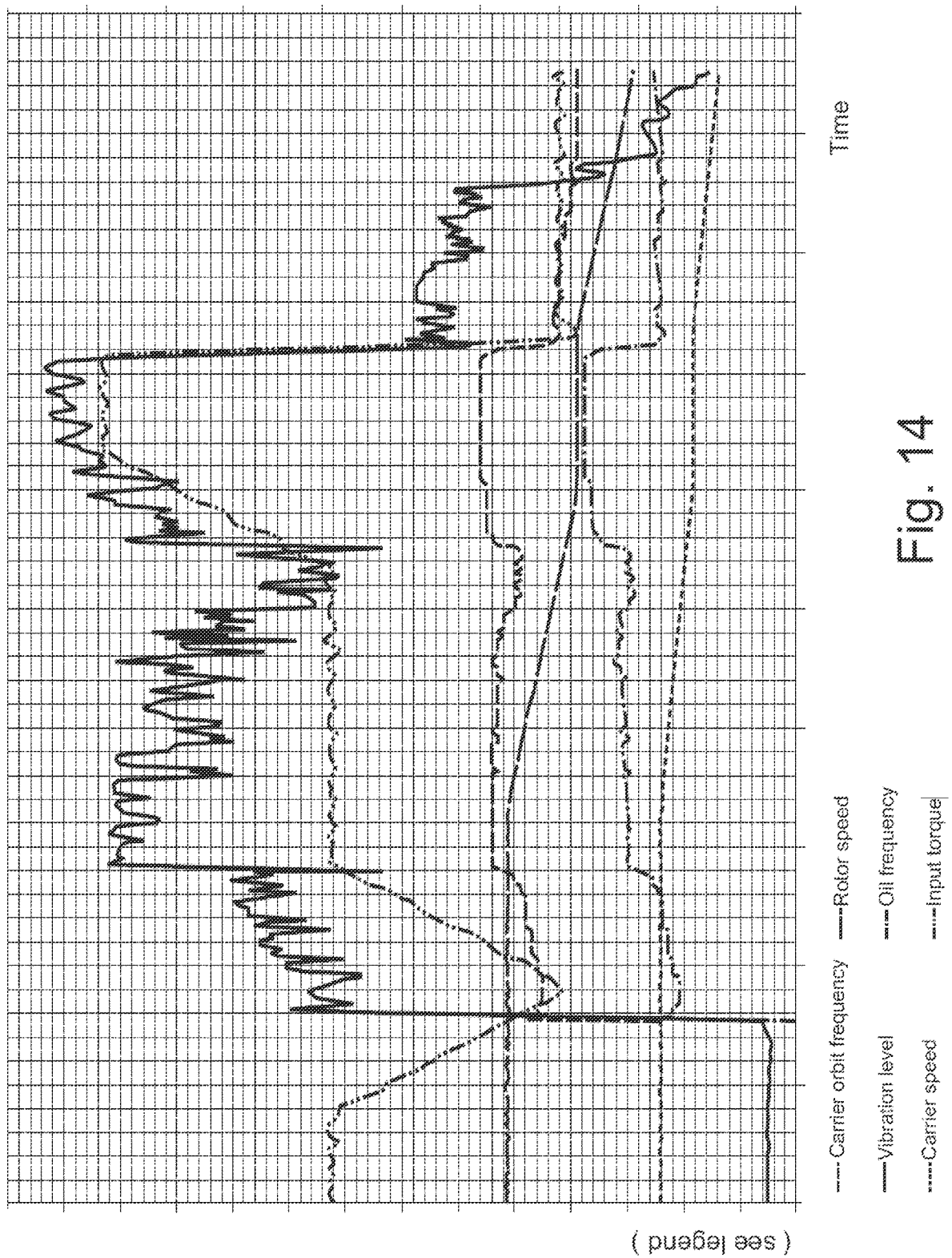
FIG. 14 is a diagram of frequencies, torques and vibration levels at a journal bearing versus time.

FIG. 14 shows, versus time on the x-axis, vibrational frequencies and rotational speeds (both in Hz), as well as the level of vibration and applied torque at a journal bearing, in this example journal bearing J4 which has a rotating carrier 34. The different curves are overlaid, so the y-axis shows, in arbitrary units, the corresponding values.

The curve denoted as "carrier orbit frequency" shows the oil-film induced vibration as seen by a fixed observer. Correspondingly, the curve denoted as "oil frequency" shows the same vibration, but as seen in a frame rotating with the carrier 34. The curve "vibration level" shows the amplitude of this vibration as measured.

The curve "carrier speed" shows the rotational speed of the carrier 34 (with respect to a fixed frame, e.g., linkages 40 (see FIG. 10). The curve "rotor speed" shows the rotational speed of the rotor 32 (with respect to the fixed frame). It is worth noting that in the case of a journal bearing having a fixed carrier, e.g., the journal bearing J1 of FIG. 1A, the curve "carrier speed" would be at zero.

The overlaid curve "input torque" shows the torque that is applied to the journal bearing J4.

At the left of FIG. 14, at a certain point in time, carrier and oil frequencies suddenly increase, and at the same time the vibration level strongly increases. This point in time indicates the onset of oil-induced vibrations. It can be further seen that the vibration level is correlated with the input torque (see time spans with roughly constant speeds), and is correlated with the speeds (see time spans with roughly constant torque). Correspondingly, a possibility to reduce the vibration level is to reduce torque and/or speed, however, in many use cases, such as in gas turbine engines, it can be desirable not to change these parameters, because reducing speed and/or torque has a direct effect on the propulsion. FIG. 14 also shows a correlation between the carrier and oil frequencies and the vibration level. Systems 50 and methods described herein allow to maintain speed and torque (or change those parameters only by a smaller amount) by changing oil temperature and/or pressure in dependence of the vibration signal.

Figure 15:
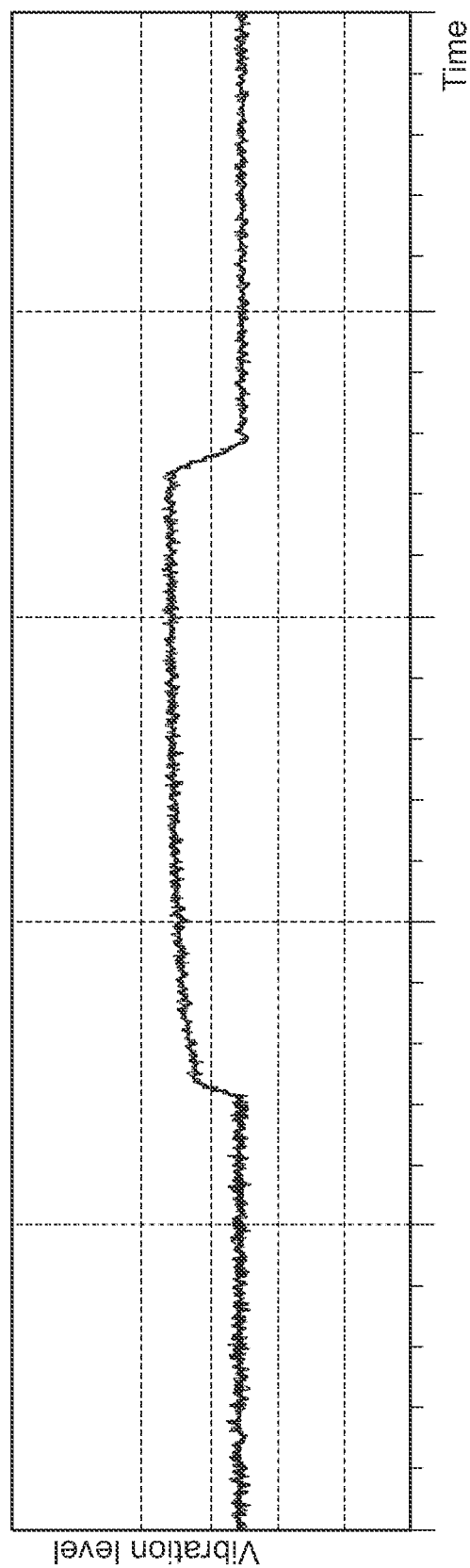
FIG. 15 is a diagram showing a level of vibration versus time.

FIG. 15 shows an example of a measured vibration level versus time. Starting from the left, the vibration level first was approximately constant, with constant speed and torque, and thus power. At a certain point in time, the power was increased, leading to an increased vibration level. After that, even though speed and power were maintained constant, the vibration level at the journal rotor frequency exhibited a trend and increased further, i.e., the vibration built up due to synchronous oil whirl or whip. At a later point in time, the control system 56 provided a control signal to decrease the oil pressure, and this led to a decrease of the vibration level to approximately the value at the left part of the diagram.

Figure 16:
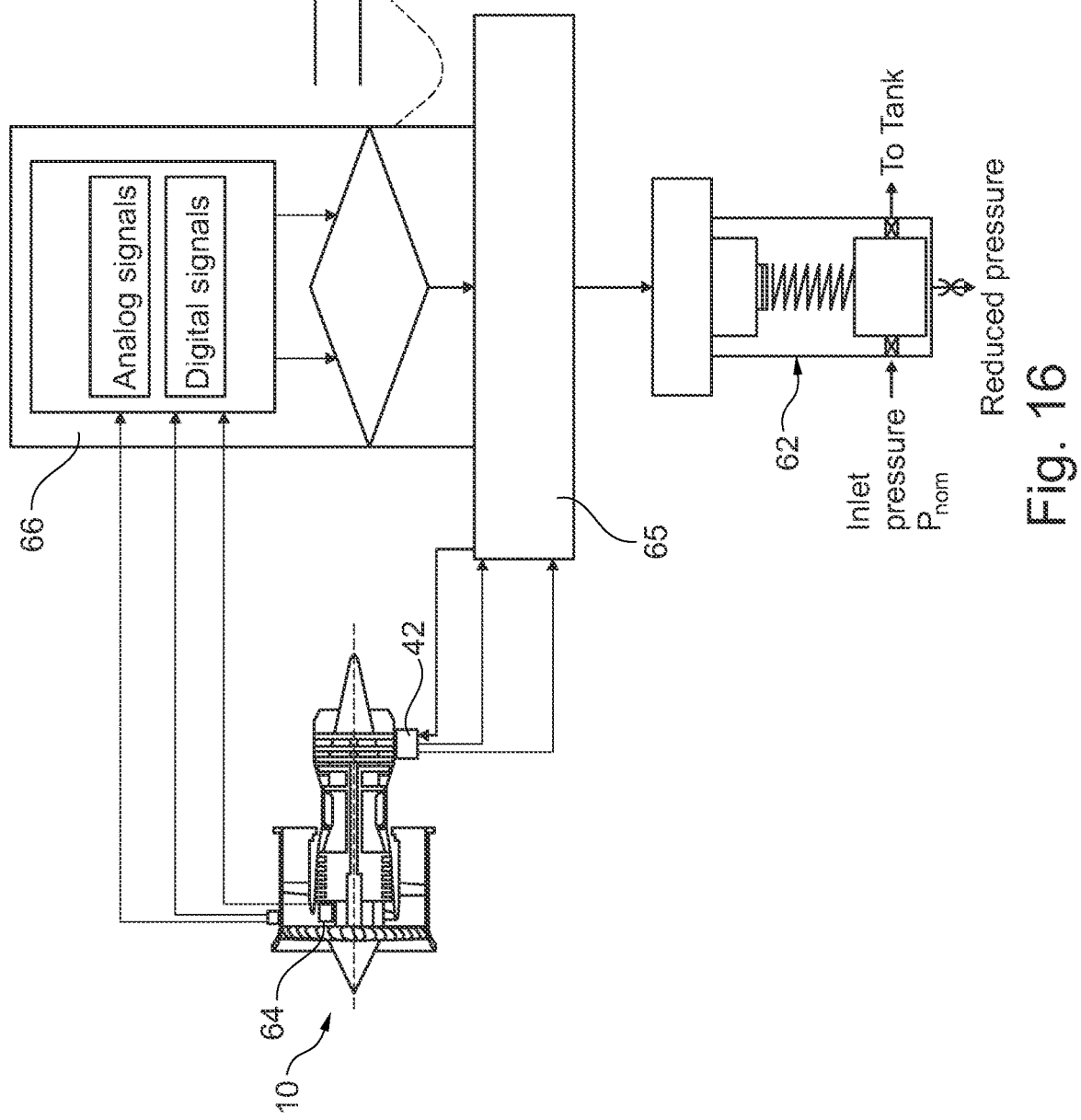
FIG. 16 is a diagram showing a flow of information between various components of a system for controlling a journal bearing.

FIG. 16 shows various components of a system to monitor and control a journal bearing J1-J4. A vibration analysis block 66 is shown which may be a component of the control system 56 of FIG. 1A. The vibration analysis block 66 receives pressure values from an oil feed pressure sensor 64 arranged so as to measure the oil feed pressure of the oil supplied to the clearance Cl of the corresponding journal bearing J1-J4. Further, the vibration analysis block 66 receives vibration signals, e.g., from a vibration signal analysis component as shown in FIG. 16. Alternatively, this component is a part of the vibration analysis block 66 which could also be directly connected to the vibration sensor 55 as shown in FIG. 1A. The vibration analysis block 66 receives or determines a magnitude of a journal bearing vibration (e.g., based on a clearance-related threshold), frequencies of the vibration (e.g., within a range of the oil-film generated orbits) and/or vibration phases (e.g., versus time, engine speed and/or engine power).

The vibration analysis block 66 fills a data structure with analog signals and digital signals. This data structure is provided to a decision logic which determines whether or not an oil-film generated vibration is present in the manner as described in detail herein. An output of the decision logic is provided to a peripheral interface controller 65. Optionally, data received at the vibration analysis block 66, or information determined therein, is stored at a data recorder 67.

The peripheral interface controller 65 may comprise the controller components 59 of FIG. 8. The peripheral interface controller 65 receives engine speed and/or engine power readings from the FADEC 42 (full authority digital engine controller) of the gas turbine engine 10. Based on the vibration-related data (which comprise and/or are based on the vibration signals of the vibration sensor 55) provided by the vibration analysis block 66, and, optionally, engine data provided by the FADEC 42, the peripheral interface controller 65 determines a set point for the pressure of the oil 53 in the clearance Cl, and provides control signals to the servo valve 62 as an active means generated based on the pressure set point.

In the present example, the servo valve 62 comprises a spring which is pre-loaded by an actor adjustable in response to the control signals. An inlet of the servo valve 62 is in fluid connection with a supply of oil at a nominal pressure Pnom. A tank outlet of the servo valve 62 is in fluid connection with an oil tank. A reduced-pressure outlet is in fluid connection with the journal bearing clearance Cl.

The peripheral interface controller 65 stores a set of predetermined pressure set points which define several steps of the pressure. These set points may be different for speed of and/or power transmitted by the journal bearing J1-J4. Accordingly, the set points may be stored as one or more look-up tables. The peripheral interface controller 65 determines, based on the received data (which particularly comprises data dependent on the vibration signals) a set point for the pressure, and adjusts the servo valve 62 accordingly.

Figure 17:
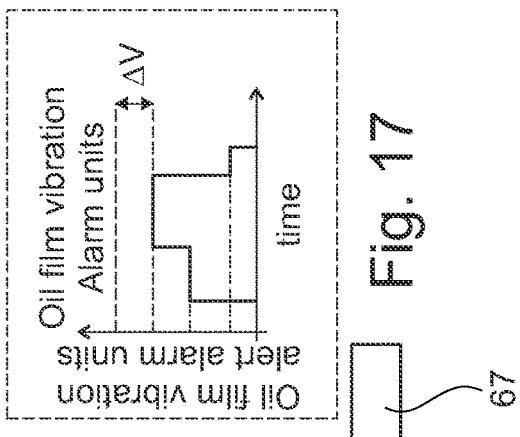
FIG. 17 is a diagram showing oil film vibration alarm units versus time.

FIG. 17 shows stepwise oil film vibration alert alarm units versus time. For example, the vibration analysis block 66 is adapted to provide the result of the vibration analysis as stepped oil film vibration alert alarm units, and in the form of a stepped voltage signal to the peripheral interface controller 65. The distances in voltage between the adjacent steps, delta V, may be equal. The peripheral interface controller 65 may determine target oil film vibration alert alarm units based on engine speed and/or power, and it may determine a difference between the target value and the real-time value. The selection of the pressure set point may depend on this difference.

Figure 18:
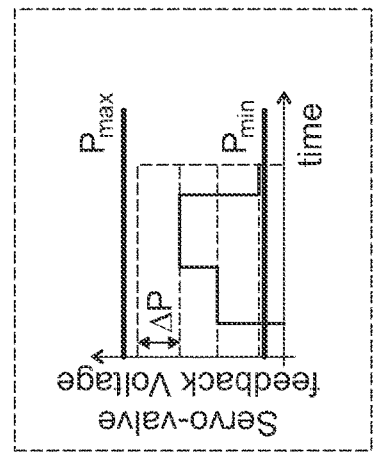
FIG. 18 is a diagram showing a servo-valve feedback voltage versus time.

FIG. 18 shows the servo-valve feedback voltage of the servo valve 62 versus time. Further, a minimum pressure P min and a maximum pressure P max are shown which define an allowable range of selectable pressure set points. P min and/or P max may depend on engine speed and/or power. Based on the result of the vibration analysis, the peripheral interface controller 65 selects one of the stepped pressure set points (indicated by dashed lines in FIG. 18) between P min and P max. The distances in pressure between the adjacent steps, delta P, may be equal. Depending on the vibration signals, the peripheral interface controller 65 may select a set point that changes a current set point by one or more steps.

The peripheral interface controller 65 may be a part of the control system 56 of FIG. 1A.

Figure 19:
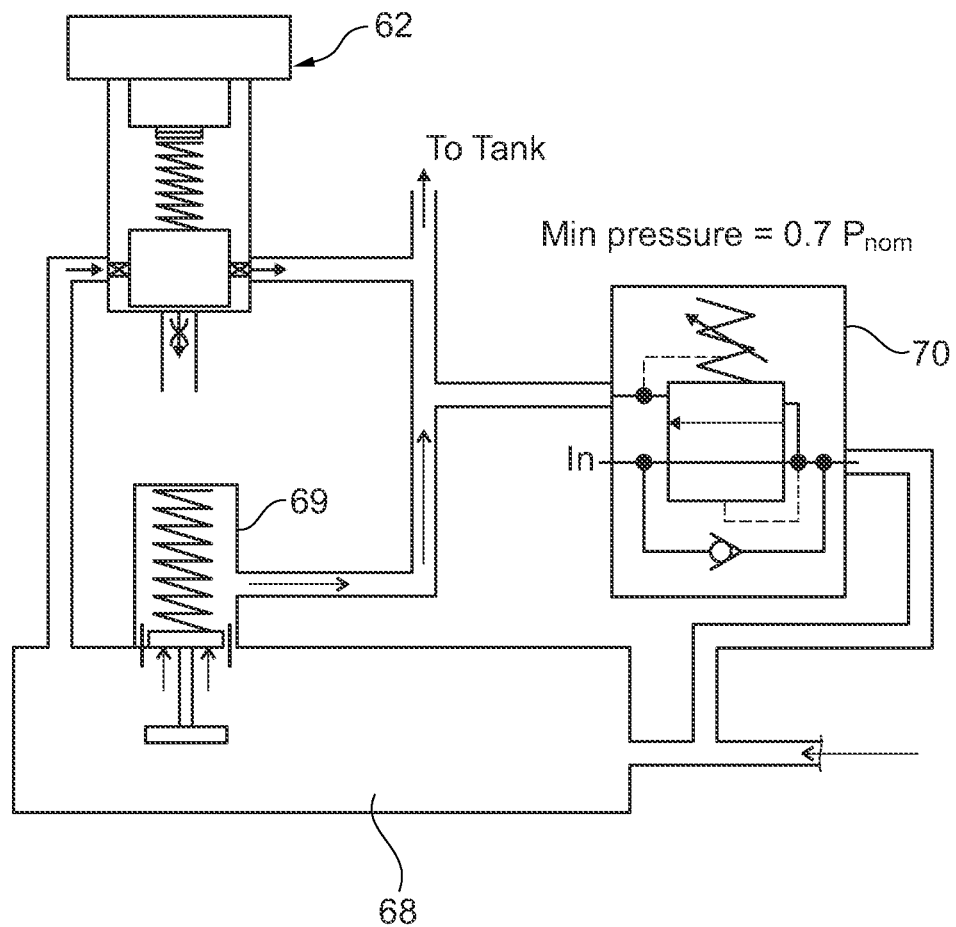
FIG. 19 is a diagram of an oil system valve arrangement.

FIG. 19 shown an optional arrangement of the servo valve 62. The servo valve 62 receives oil at nominal pressure Pnom at the inlet from an oil chamber 68. The oil chamber 68 is equipped with a relief pressure valve 69. The relief pressure valve 69 opens when the nominal pressure Pnom is exceeded. Optionally, an allowed exceedance of, e.g., 2% of Pnom is provided so that, in this example, the relief pressure valve opens only at 1.02 Pnom. The nominal pressure Pnom may be dependent on the speed and/or power of the journal bearing J1-J4, and or on flight conditions for aircraft turbine applications. Thus, the relief pressure valve 69 may be adjustable accordingly, in particular by the control system 56. The pressure relief valve 69 may be designed so that it cannot allow the pressure to drop below a threshold (e.g., a spool thereof cannot physically open more than the movement that would generate a feed pressure of 80% of Pnom or below).

An optional further servo valve 70 receives high-pressure oil at an inlet and is connected with the oil chamber 68 to maintain the pressure of the oil in the oil chamber 68 at or above a minimum pressure of, e.g., 0.7 Pnom. As such, pressure drops may be compensated. An inlet of the oil chamber 68 is connected to an oil plenum or an oil pump.

Servo valve 62 may be a proportional servo valve. As an alternative to the servo valve 62, two servo valves can be used in parallel, regulating a share of the pressure each. For instance, one of the two is regulated normally open to ensure the minimum allowable pressure whilst the other provides the remaining pressure to Pnom.

Thus, when a critical oil film vibration is detected, the oil feed pressure is reduced in steps, starting from 100% nominal (Pnom) but preventing pressure drops below a minimum pressure, e.g. 80% or 78% of Pnom. The nominal feed pressure, and consequently the minimum allowable pressure depends on speed and power (or equivalently, on speed and circulating torque). The pressure drop is controlled by the control system 56, wherein a control loop can be closed on the vibration algorithm logic signal (in steps), and the servo-valve opened and closed accordingly. A closed loop on pressure is also possible in addition or as an alternative.

In case of a malfunctioning of the servo valve 62 it may be safer for the system to remain at 100% of the nominal oil feed pressure than relief the pressure to the minimum value, and instead communicate to the FADEC 42 to regulate engine speed and/or power until the vibration trending is stopped and brought below the alert limits. The system 50 may comprise a corresponding fault detection.

The system 50 is thus adapted to limit the oil feed pressure of the journal bearing J1-J4 to a nominal feed pressure. The nominal oil feed pressure of the journal bearing is variated, by means of the servo valve arrangement, versus speed and or power. If the maximum pressure requirement is constant versus speed and power then the functionality may be accomplished by means of the (e.g., calibrated) relief pressure valve, that may be designed to mechanically open in case of the oil feed pressure exceeding the nominal value (e.g., in the form of a calibrated spring). Optionally, a spring can be calibrated for this purpose, so that that the oil chamber 68 connected with the scavenge is opened when the pressure is higher than the not-to-exceed preset constant value.

Direct acting, normally-open proportional pressure reducing relieving valves can be used to electronically reduce the inlet pressure (to one leg) of a hydraulic circuit. A transmission-shifter valve can be used in the system 50 to provide a fixed pressure regardless of inlet pressure.

The system 50 provides the possibility of an active control that is able variate the not-to-exceed oil feed pressure versus the speed and/or torque given the operational conditions of the journal bearing, in which case the maximum pressure control is executed by an electrically controlled servo-valve.

The system 50 further allows to decrease the oil feed pressure of the journal bearing J1-J4 and to maintain it at the determined level as long as required. The pressure regulation is based on an active control loop that is closed on one or more of digital or analogical signals generated on the basis of vibration magnitude, frequency and phase, or of a signal combination. This loop may be actuating the pressure regulation via an electronically controlled servo valve (e.g. proportional, with or without spool).

Further, the system 50 is capable of regulating the oil feed pressure in steps on the basis of a pressure and/or vibration signal feedback(s) single or parallel loop in order to limit the occurrence of unexpected (out-of-design) conditions for the journal bearing. The system may regulate the oil feed pressure of the journal bearing J1-J4 to predefined steps, e.g. 0.95 Pnom, 0.90 Pnom, and 0.85 Pnom.

Further, the system 50 may comprise a safety functionality that prevents the oil feed pressure of the journal bearing to drop under a specific predefined value with respect to the nominal oil feed pressure, e.g., 0.7 Pnom. This allows to prevent conditions where an unwanted deterioration of the journal bearing load capacity is established by a too extreme or instable reduction of the oil feed pressure. The minimum oil feed pressure (at each of the speed-torque operational points) and/or the magnitude and sequence of pressure steps may be determined by calculations of the journal bearing performances. A look up table may specify the pressure regulations that are possible to be actuated, e.g., for each of the operational points of the flight envelope. The system 50 may be adapted so that if any failure in the system occurs then then the valves will lever the oil feed pressure on the nominal value and send a signal to FADEC 42 in order to variate the engine speed and power conditions.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A system for monitoring a journal bearing, the system comprising:
    the journal bearing including a carrier, a rotor arranged rotatable about a rotational axis relative to the carrier, and a fluid in a clearance between the rotor and the carrier;
    a speed sensor configured to determine a rotational speed of the rotor relative to the carrier;
    a vibration sensor configured to measure a vibration of the rotor and provide a vibration signal corresponding to the vibration; and
    a control system adapted to determine whether or not the vibration signal of the rotor comprises a frequency that is synchronous with the rotational speed, or near-synchronous, within a predefined range of frequencies adjacent synchronicity, with the rotational speed, wherein the control system is adapted to provide a control signal based on the determination;
    an active system configured for detuning the vibration of the rotor in response to the provision of the control signal by the control system, the active system including at least one chosen from a valve affecting oil flow through the journal bearing and an engine controller.

2. The system according to claim 1, wherein the predefined range of frequencies adjacent synchronicity is 0.6 to 1.0 times the rotational speed of the rotor.

3. The system according to claim 1, wherein the control system is further adapted to determine that the vibration signal comprises a frequency that is sub-synchronous with the rotational speed within a predefined range of relative frequencies, wherein the predefined range of relative frequencies is 0.3 to 0.5 times the rotational speed of the rotor, wherein the control system is adapted to determine whether the rotor approaches synchronicity by determining whether or not the vibration signal at a first point in time comprises a sub-synchronous frequency, and thereafter, at a second point in time, comprises a near-synchronous or synchronous frequency, and wherein the control system is adapted to determine a change of a phase of the vibration signal, and to provide the control signal based on the change of the phase.

4. The system according to claim 3, wherein the control system is adapted to provide the control signal when the determined change of the phase within a predefined period of time is larger than a predefined threshold.

5. The system according to claim 1, wherein the control system is adapted to provide the control signal upon determining that the vibration signal comprises a frequency that is at least chosen from synchronous, near-synchronous, and approaching synchronicity.

6. The system according to claim 1, wherein the control system is adapted to provide the control signal when the vibration signal comprises a frequency that is in a further predefined range relative to the rotational speed or has a magnitude above a predefined threshold, the system further comprising:
    wherein the active system is configured to perform at least one chosen from decrease a pressure of the fluid in the clearance and increase a temperature of the fluid in the clearance in response to the provision of the control signal by the control system.

7. The system according claim 6, wherein the active system is further configured to change a speed of the journal bearing, or a torque acting on the journal bearing.

8. A system comprising:
    a journal bearing including a carrier, a rotor arranged rotatable about a rotational axis relative to the carrier, and a fluid in a clearance between the rotor and the carrier;
    a vibration sensor configured to measure a vibration of the rotor and provide a vibration signal corresponding to the vibration;
    a control system adapted to determine a pressure set point for the fluid in the clearance based on the vibration signal, and to provide control signals generated based on the pressure set point; and
    an active system including at least one valve configured to modify a pressure of the fluid in the clearance based on the control signals;
    wherein the control system is adapted to determine the pressure set point by selecting a predefined pressure set point from a set of predefined pressure set points based on the vibration signal;
    wherein each predefined pressure set point of the set of predefined pressure set points is a value between a minimum pressure value and a maximum pressure value, wherein the control system is adapted to determine at least one chosen from the minimum pressure value and the maximum pressure value based on a rotational speed of the rotor relative to the carrier.

9. The system according to claim 8, wherein the control system is adapted to generate the control signals by a feedback control loop using at least one chosen from a pressure value and the vibration signal for a feedback parameter.

10. The system according to claim 8, wherein the at least one valve includes an adjustable valve.

11. The system according to claim 8, wherein the control system is adapted to determine whether or not the vibration signal of the rotor comprises a frequency that is synchronous with a rotational speed of the rotor, or near-synchronous within a first predefined range of frequencies adjacent synchronicity with the rotational speed of the rotor relative to the carrier; and to determine whether the vibration signal comprises a frequency that, at least one of, is in a second predefined range relative to the rotational speed and has a magnitude above a predefined threshold.

12. The system according to claim 11, wherein the control system is further adapted to determine that the vibration signal comprises a frequency that is sub-synchronous with the rotational speed within a third predefined range of relative frequencies, wherein the third predefined range of relative frequencies is 0.3 to 0.5 times the rotational speed of the rotor.

13. The system according to claim 11, wherein the control system is adapted to determine whether the rotor approaches synchronicity by determining whether or not the vibration signal at a first point in time comprises a sub-synchronous frequency, and thereafter, at a second point in time, comprises a near-synchronous or synchronous frequency.

14. The system according to claim 8, wherein the control system is adapted to determine a change of a phase of the vibration signal, and to provide a control signal based on the change of the phase.

15. The system according to claim 8, wherein the rotor is a planet gear of an epicyclic gearbox, and the carrier is a planet carrier of the epicyclic gearbox.

16. A gas turbine engine for an aircraft comprising:
the system according to claim 15;
an engine core comprising a turbine, a compressor, and a core shaft connecting the turbine to the compressor; and
a fan located upstream of the engine core, the fan comprising a plurality of fan blades;
wherein the epicyclic gearbox receives an input from the core shaft and outputs drive to the fan to drive the fan at a lower rotational speed than the core shaft.

17. A method for monitoring a journal bearing, the journal bearing including a carrier, a rotor arranged rotatable about a rotational axis relative to the carrier, and a fluid in a clearance between the rotor and the carrier, the method comprising the steps of:

determining a rotational speed of the rotor relative to the carrier;

measuring a vibration signal corresponding to a vibration of the rotor; and determining whether or not the vibration signal of the rotor comprises a frequency that is synchronous with the rotational speed, or near-synchronous within a predefined range of frequencies adjacent synchronicity with the rotational speed;

detuning the vibration of the rotor, the detuning comprising:

providing a control signal when the vibration signal comprises a frequency that is in a predefined range relative to the rotational speed; and at least one chosen from decreasing a pressure of the fluid in the clearance and increasing a temperature of the fluid in the clearance in response to the provision of the control signal.

* * * * *